(12) United States Patent
Kim et al.

(10) Patent No.: US 11,113,511 B2
(45) Date of Patent: Sep. 7, 2021

(54) MAKEUP EVALUATION SYSTEM AND OPERATING METHOD THEREOF

(71) Applicant: LG HOUSEHOLD & HEALTH CARE LTD., Seoul (KR)

(72) Inventors: Sang E Kim, Seoul (KR); Do Hyuk Kwon, Seoul (KR); Do Sik Hwang, Seoul (KR); Tae Seong Kim, Seoul (KR); Doo Hyun Park, Seoul (KR); Ki Hun Bang, Seoul (KR); Tae Joon Eo, Seoul (KR); Yo Han Jun, Seoul (KR); Se Won Hwang, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 18 days.

(21) Appl. No.: 16/482,511

(22) PCT Filed: Feb. 1, 2018

(86) PCT No.: PCT/KR2018/001412
§ 371 (c)(1),
(2) Date: Jul. 31, 2019

(87) PCT Pub. No.: WO2018/143707
PCT Pub. Date: Aug. 9, 2018

(65) Prior Publication Data
US 2019/0362134 A1 Nov. 28, 2019

(30) Foreign Application Priority Data

Feb. 1, 2017 (KR) .................. 10-2017-0014403
Feb. 1, 2018 (KR) .................. 10-2018-0012931

(51) Int. Cl.
*G06K 9/00* (2006.01)
*G06N 20/00* (2019.01)
(Continued)

(52) U.S. Cl.
CPC ........ *G06K 9/00275* (2013.01); *A45D 44/00* (2013.01); *G06K 9/6256* (2013.01); *G06N 20/00* (2019.01); *G06T 11/206* (2013.01)

(58) Field of Classification Search
CPC .. G06K 9/00275; G06K 9/6256; G06N 20/00; A45D 44/00; G06T 11/206
See application file for complete search history.

(56) References Cited

U.S. PATENT DOCUMENTS 10,292,481 B2 * 5/2019 Yamanashi ............. G06T 11/00
10,339,685 B2    7/2019 Fu et al.
(Continued)

FOREIGN PATENT DOCUMENTS

JP     2000-105819 A    4/2000
JP     2014-147561 A    4/2000
(Continued)

*Primary Examiner* — Utpal D Shah
(74) *Attorney, Agent, or Firm* — Birch, Stewart, Kolasch & Birch, LLP

(57) ABSTRACT

A makeup evaluation system according to an embodiment of the present invention includes a mobile terminal for photographing a facial image and transmitting the photographed facial image to a makeup server, and the makeup server for storing makeup score data and, when receiving the facial image from the mobile terminal, detecting at least one face region in the facial image, calculating a makeup score for each of the detected face regions on the basis of the makeup score data, and transmitting the calculated makeup score to the mobile terminal.

13 Claims, 32 Drawing Sheets

(51) Int. Cl.
  *G06K 9/62* (2006.01)
  *A45D 44/00* (2006.01)
  *G06T 11/20* (2006.01)

(56) References Cited

U.S. PATENT DOCUMENTS

| | | | |
|---|---|---|---|
| 10,660,425 B2* | 5/2020 | Yamanashi | A45D 44/005 |
| 10,666,853 B2* | 5/2020 | Tomita | H04N 5/232 |
| 10,691,932 B2* | 6/2020 | Lee | H04N 7/141 |
| 10,762,333 B2* | 9/2020 | Takei | G06Q 50/10 |
| 2013/0058543 A1 | 3/2013 | Thomas et al. | |
| 2015/0050624 A1* | 2/2015 | Yamanashi | G06Q 50/10 |
| | | | 434/100 |
| 2015/0086945 A1* | 3/2015 | Yamanashi | G09B 19/0076 |
| | | | 434/100 |
| 2015/0366328 A1 | 12/2015 | Tamura et al. | |
| 2019/0208892 A1* | 7/2019 | Besen | G06F 3/03545 |

FOREIGN PATENT DOCUMENTS

| | | |
|---|---|---|
| JP | 2002-324126 A | 11/2002 |
| JP | 5261586 B2 | 8/2013 |
| JP | 2013-171409 A | 9/2013 |
| JP | 2014-149696 A | 8/2014 |
| JP | 2016-66383 A | 4/2016 |
| JP | 2016-129027 A | 7/2016 |
| KR | 10-2006-0062263 A | 6/2006 |
| KR | 10-2011-0127396 A | 11/2011 |
| KR | 10-2012-0070985 A | 7/2012 |
| KR | 10-2014-0061604 A | 5/2014 |
| WO | WO 2015/127354 A1 | 8/2015 |

* cited by examiner

FIG. 5

| 500 | A MAKEUP | B MAKEUP | C MAKEUP | NO MAKEUP |
|---|---|---|---|---|
| LOWER | A1 | B1 | C1 | D1 |
| MIDDLE AND LOWER | A2 | B2 | C2 | D2 |
| MIDDLE | A3 | B3 | C3 | D3 |
| MIDDLE AND UPPER | A4 | B4 | C4 | D4 |
| UPPER | A5 | B5 | C5 | D5 |

A1, A2, B1, B2, C1, C2, D1, D2 : FIRST GROUP
A3, A4, B3, B4, C3, C4, D3, D4 : SECOND GROUP
A5, B5, C5, D5 : THIRD GROUP

FIG. 6
| | BASE | EYEBROW | EYE | LIP | BLUSHER & SHADING |
|---|---|---|---|---|---|
| A MAKEUP | | | | | |
|  | 5 | 3.5 | 4 | 5.5 | 4.5 |
| 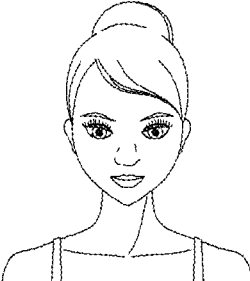 | 9 | 6 | 2.5 | 5.5 | 4 |
| ... | ... | ... | ... | ... | ... |

FIG. 9

| | A MAKEUP |||||
|---|---|---|---|---|---|
| BASE | ... | ... | ... | ... ||
| EYEBROW | ... | ... | ... | ... ||
| EYE | UPPER (9.0~10.0) | | | | ... |
| | MIDDLE AND UPPER (7.0~8.9) | | | | ... |
| | MIDDLE (5.0~6.9) | | | | ... |
| | MIDDLE AND LOWER (3.0~4.9) | | | | ... |
| | LOWER (0.1~2.9) | | | | ... |
| | 0 | | | | ... |
| LIP | ... | ... | ... | ... ||
| BLUSHER & SHADING | ... | ... | ... | ... ||

FIG. 13
| | BASE | EYEBROW | EYE | LIP | BLUSHER & SHADING | |
|---|---|---|---|---|---|---|
| | | | | | | |
| A MAKEUP |||||||
|---|---|---|---|---|---|---|
| | BASE | EYEBROW | EYE | LIP | BLUSHER & SHADING | |
| 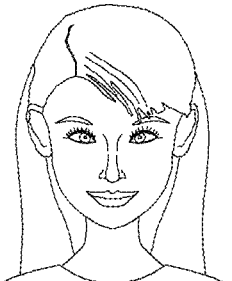 | 5.5 | 3 | 3.5 | 5.5 | 5 | ⎫ |
| 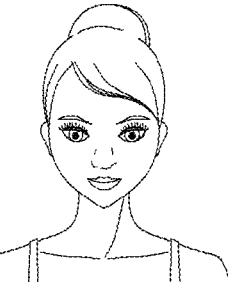 | 9.5 | 6.5 | 0.5 | 5 | 4.5 | ⎬ 1301 |
| ... | ... | ... | ... | ... | ... | ⎭ |
| 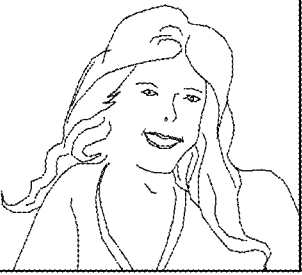 | 4 | 9 | 4.5 | 6 | 8.5 | } 1302 |

FIG. 24
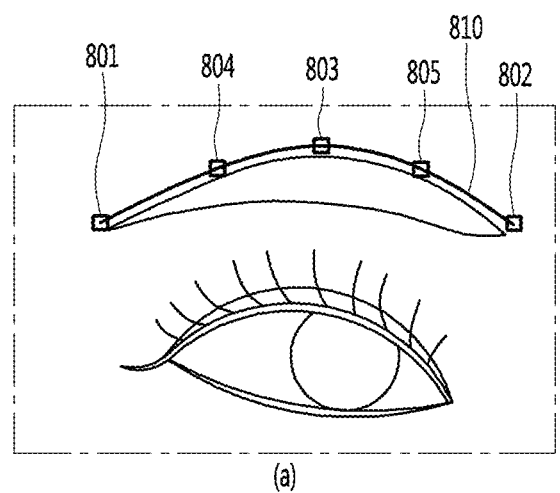
(a)
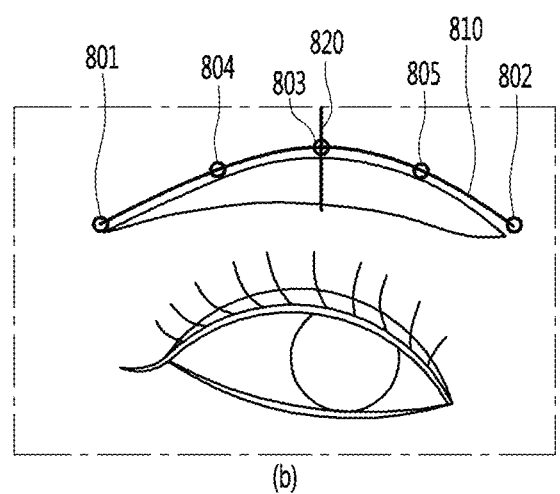
(b)

FIG. 25
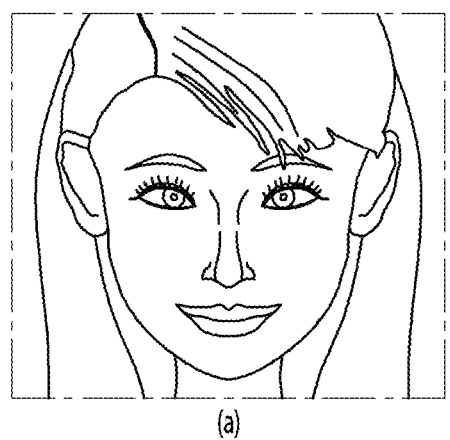
(a)
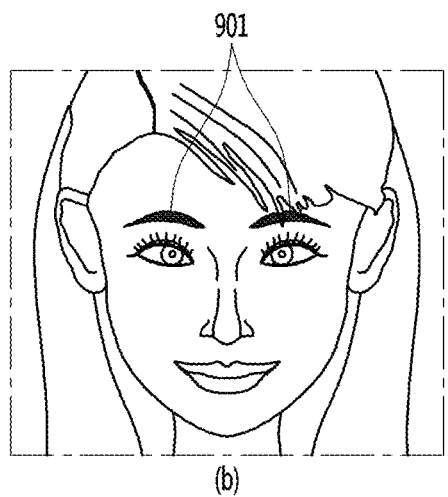
(b)
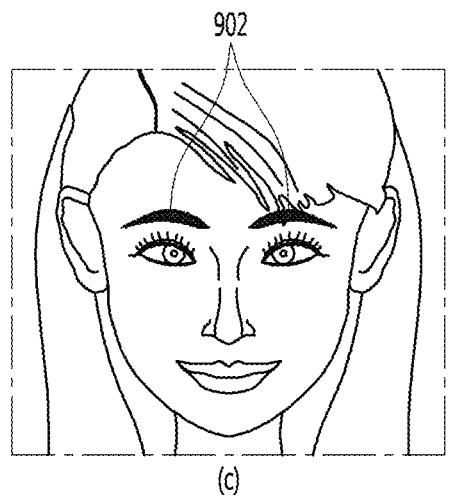
(c)
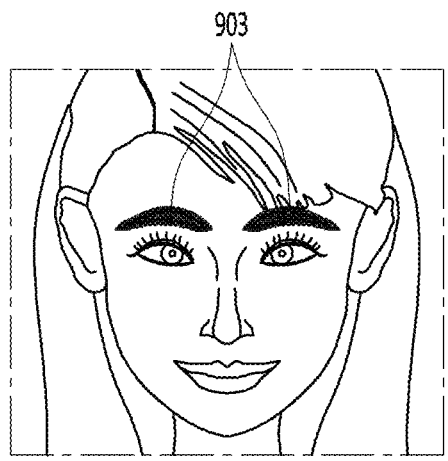
(d)

FIG. 30
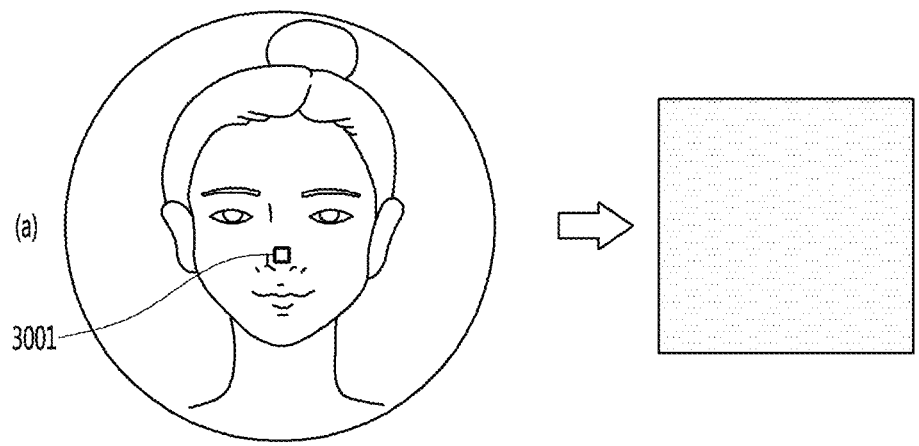
FIG. 31
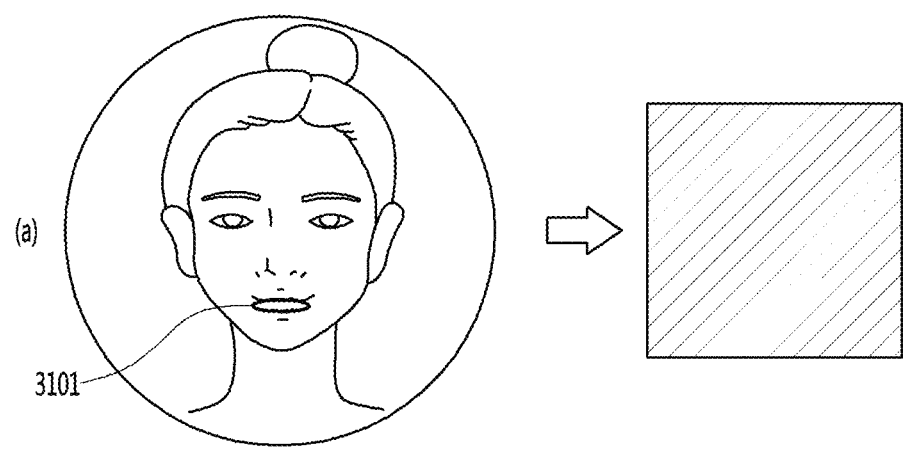
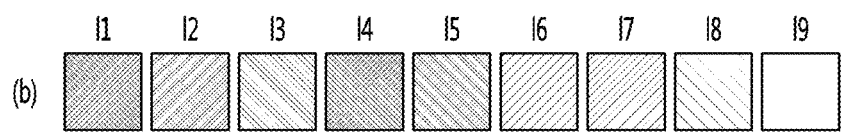

FIG. 32
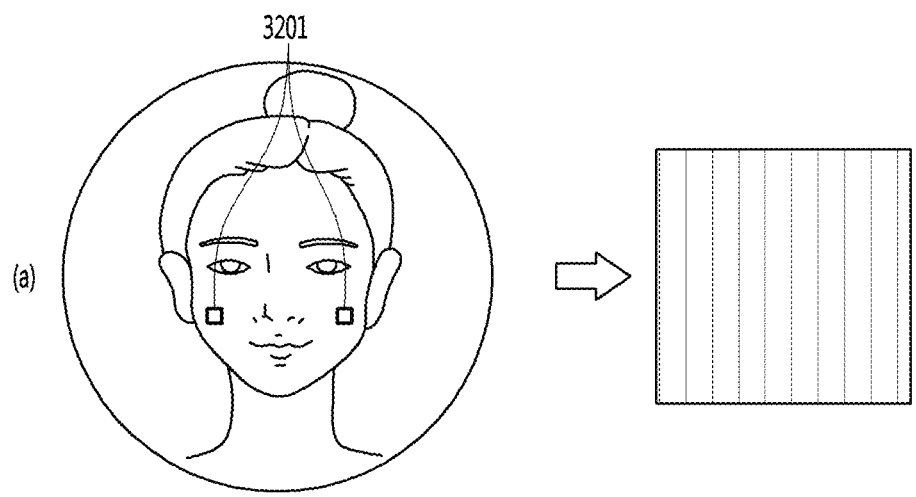
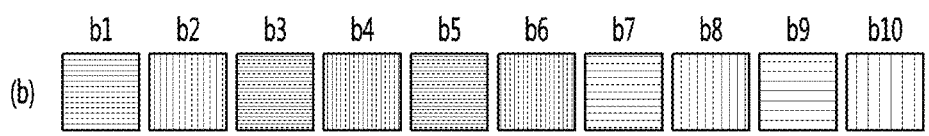
FIG. 33
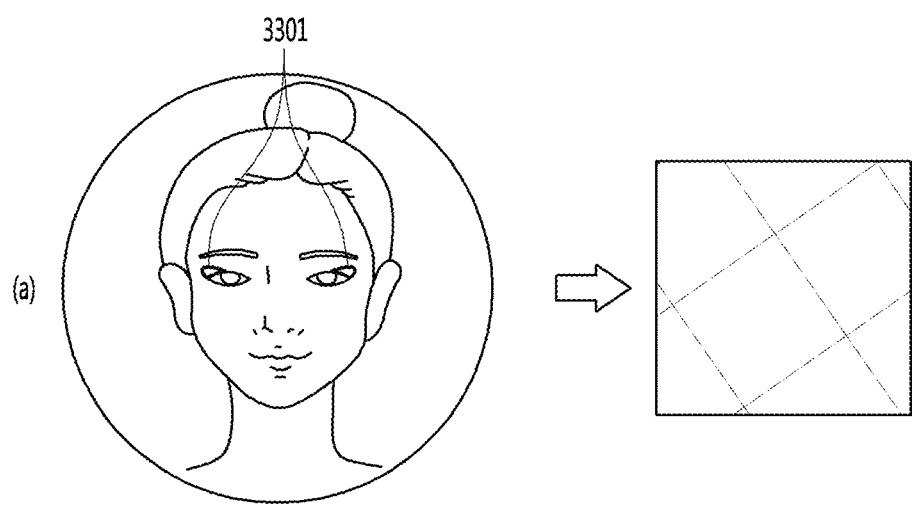

| | s1 | s2 | s3 | s4 | s5 | s6 | s7 | s8 | s9 | s10 |
|---|---|---|---|---|---|---|---|---|---|---|
| l1 | 2 | 3 | 2 | 3 | 2 | 3 | 2 | 3 | 2 | 3 |
| l2 | 2 | 3 | 2 | 3 | 2 | 3 | 2 | 3 | 2 | 3 |
| l3 | 2 | 3 | 3 | 3 | 2 | 3 | 2 | 3 | 3 | 3 |
| l4 | 1 | 1 | 1 | 2 | 3 | 3 | 2 | 2 | 3 | 3 |
| l5 | 3 | 2 | 2 | 2 | 3 | 2 | 3 | 2 | 2 | 2 |
| l6 | 3 | 2 | 2 | 2 | 3 | 2 | 3 | 2 | 2 | 2 |
| l7 | 1 | 1 | 2 | 1 | 2 | 2 | 2 | 1 | 1 | 1 |
| l8 | 1 | 1 | 2 | 2 | 2 | 2 | 2 | 1 | 2 | 2 |
| l9 | 1 | 1 | 2 | 1 | 2 | 2 | 2 | 2 | 2 | 2 |

(b)

| | s1 | s2 | s3 | s4 | s5 | s6 | s7 | s8 | s9 | s10 |
|---|---|---|---|---|---|---|---|---|---|---|
| b1 | 2 | 3 | 2 | 3 | 2 | 3 | 2 | 3 | 2 | 3 |
| b2 | 3 | 2 | 3 | 2 | 3 | 1 | 3 | 2 | 2 | 2 |
| b3 | 1 | 1 | 2 | 2 | 2 | 1 | 2 | 2 | 3 | 2 |
| b4 | 1 | 1 | 1 | 1 | 1 | 2 | 1 | 2 | 2 | 1 |
| b5 | 1 | 1 | 2 | 2 | 3 | 2 | 2 | 1 | 1 | 2 |
| b6 | 1 | 1 | 1 | 1 | 1 | 1 | 2 | 2 | 2 | 2 |
| b7 | 2 | 2 | 3 | 2 | 2 | 2 | 2 | 2 | 1 | 2 |
| b8 | 1 | 1 | 3 | 1 | 1 | 1 | 3 | 3 | 2 | 3 |
| b9 | 1 | 1 | 2 | 1 | 2 | 1 | 3 | 2 | 2 | 3 |
| b10 | 1 | 1 | 1 | 1 | 1 | 1 | 1 | 2 | 2 | 2 |

FIG. 35
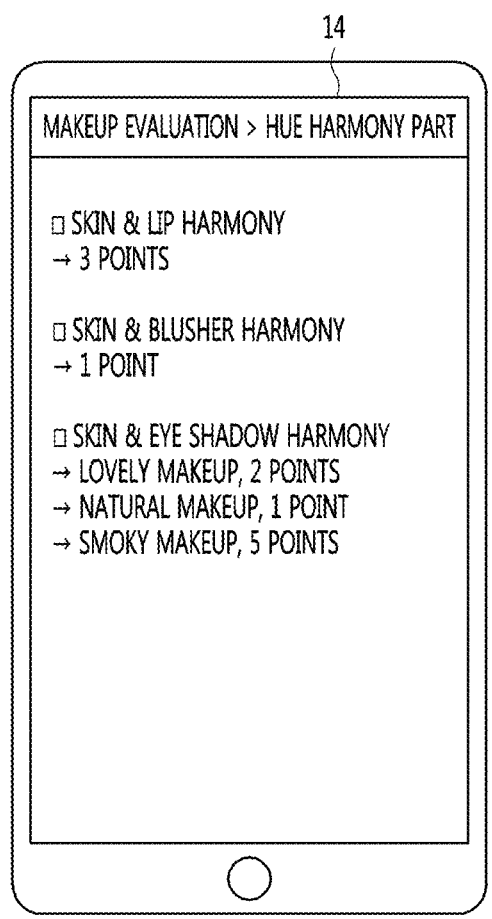
FIG. 36
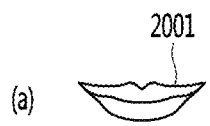
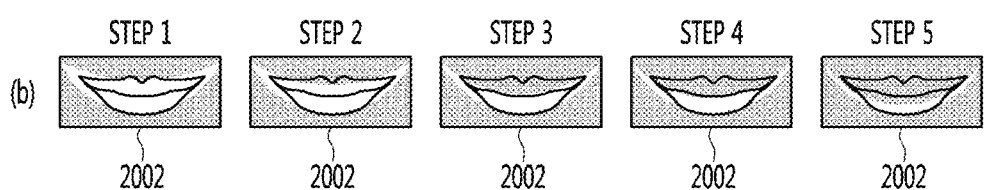

FIG. 38
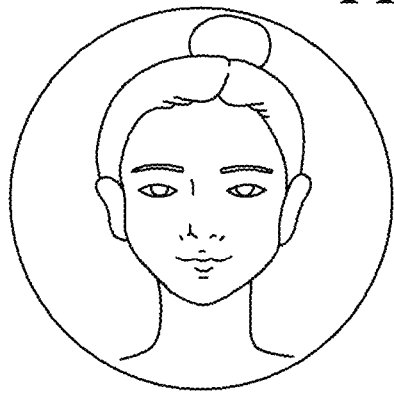
(a)
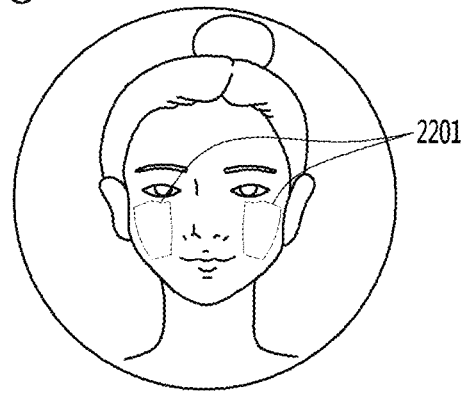
(b)
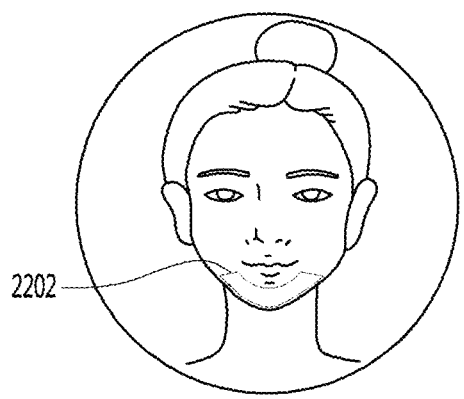
(c)
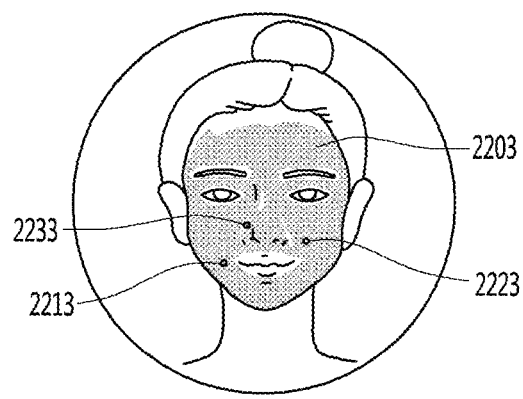
(d)
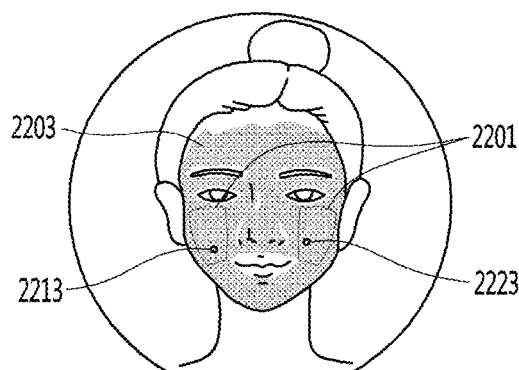
(e)

MAKEUP EVALUATION SYSTEM AND OPERATING METHOD THEREOF

CROSS REFERENCE TO RELATED APPLICATIONS

This application is the National Phase of PCT International Application No. PCT/KR2018/001412, filed on Feb. 1, 2018, which claims priority under 35 U.S.C. 119(a) to Patent Application Nos. 10-2017-0014403, filed in the Republic of Korea on Feb. 1, 2017 and 10-2018-0012931, filed in the Republic of Korea on Feb. 1, 2018, all of which are hereby expressly incorporated by reference into the present application.

TECHNICAL FIELD

The present invention relates to a makeup evaluation system and an operating method thereof.

BACKGROUND ART

Recently, a user's interest in cosmetics, makeup, etc. is increasing according to the development of beauty industry. Accordingly, the user's needs for cosmetics, makeup, and the like tend to be diversified.

Meanwhile, since each individual user has various skin colors, face shapes, features, etc., makeup suited for the individual user may be different. Thus, the user may have difficulty in selecting makeup suited for himself/herself. The user may be wondering whether the makeup is well done after the makeup, or which parts should be complemented.

Recently, in accordance with such a trend, applications for applying virtual makeup to a user's face have been developed. In this case, although they may cause curiosity and interest of the user, there is a limit that an individual has to decide which makeup is suitable for the user. That is, it is difficult to provide customized services for individual users. For example, in a case of a beauty service currently provided, the collaboration of makeup specialists is not included, or even if there is collaboration of makeup specialists, it may be based on limited data. Therefore, there are difficulties in providing customized services to individual users.

Meanwhile, recently, application fields of machine learning (ML) technology, especially deep learning (DL) technology, have been expanded.

ML technology is a technology that may extract features through a lot of data, and when new data is input, a computer may classify itself according to features.

DL technology is a part of ML technology. DL technology which is based on artificial neural networks (ANN) for constructing artificial intelligence, refers to a technology in which a computer classifies data by finding patterns from big data as if human beings distinguish things.

A customized makeup may be provided to a user based on more objective data by applying DL technology to a makeup service.

DISCLOSURE

Technical Problem

The present invention is directed to providing a makeup evaluation system and an operating method thereof for evaluating makeup of a user.

The present invention is directed to providing a makeup evaluation system and an operation method thereof that provides excellence of makeup in numerical values by analyzing makeup in a photograph.

More specifically, the present invention is directed to providing a makeup evaluation system and an operation method thereof for evaluating makeup through reliable score data based on an evaluation of a makeup specialist.

The present invention is directed to providing a makeup evaluation system and an operation method thereof, which is constructing a database for automatically evaluating makeup through machine learning technology.

The present invention is directed to providing a makeup evaluation system and an operation method thereof for evaluating makeup for each part of a user's face.

Technical Solution

A makeup evaluation system according to an embodiment of the present invention includes a mobile terminal for photographing a facial image and transmitting the photographed facial image to a makeup server, and the makeup server for storing makeup score data and, when receiving the facial image from the mobile terminal, detecting at least one face region in the facial image, calculating a makeup score for each of the detected face regions on the basis of the makeup score data, and transmitting the calculated makeup score to the mobile terminal, wherein the makeup server, when receiving a makeup theme from the mobile terminal, calculates an makeup score according to the makeup theme, and the makeup score may be calculated differently according to a shape of the detected face region and the makeup theme.

Advantageous Effects

According to an embodiment of the present invention, it is possible to provide a user with a more reliable makeup evaluation service. Specifically, according to the embodiment of the present invention, it is possible to provide a makeup evaluation service similar to an evaluation of a makeup specialist.

According to an embodiment of the present invention, there is an advantage that makeup may be evaluated by detecting each region of a face and applying an algorithm. More specifically, since a size, a shape, and the like of the face are different for each user, even if the same makeup is performed, there are a person who is suitable for the makeup and a person who is not suitable therefor. Therefore, according to the present invention, makeup evaluation considering face characteristics of a user may be performed by extracting a region of each face part and applying the algorithm to the extracted region, and thus there is an advantage that a precise makeup evaluation may be performed.

According to an embodiment of the present invention, there is an advantage that it is possible to evaluate whether makeup is good or not for each corresponding part by extracting a region of each face part and applying different algorithms to each extracted region and it is possible to evaluate an overall makeup score of each face part.

According to an embodiment of the present invention, there is an advantage that it is possible to more accurately recognize a face region by using an RGB value of a region of each face part.

According to an embodiment of the present invention, since makeup is evaluated by using a Lab value showing the same value regardless of characteristics of a display unit, there is an advantage that an objective makeup evaluation may be performed regardless of an evaluation medium such as a model of a mobile terminal.

According to an embodiment of the present invention, there is an advantage that it is also possible to perform detailed makeup evaluation such as hue harmony and color uniformity in addition to simply evaluating a color of makeup.

DESCRIPTION OF DRAWINGS

FIG. 5 is an illustrative view for describing a method of receiving image data by the makeup server according to the first embodiment of the present invention.

FIG. 6 is an illustrative view for describing a makeup score data according to the first embodiment of the present invention.

FIG. 9 is a view for describing a makeup evaluation database generated according to the first embodiment of the present invention.

FIG. 13 is an illustrative view for describing a regenerated makeup evaluation database according to the first embodiment of the present invention.

FIGS. 21 to 25 are views for describing an evaluation algorithm applied to an eyebrow part evaluation according to the second embodiment of the present invention.

FIGS. 30 to 34 are views for describing an evaluation algorithm applied to a hue harmony part evaluation according to the second embodiment of the present invention.

FIG. 35 is an illustrative view for describing a method of displaying an evaluation result of a hue harmony part according to the second embodiment of the present invention.

FIG. 36 is a view for describing an evaluation algorithm applied to a lip part evaluation according to the second embodiment of the present invention.

FIG. 38 is a view for describing an evaluation algorithm applied to a blemish part evaluation according to the second embodiment of the present invention.

MODES OF THE PRESENT INVENTION

Figure 1:
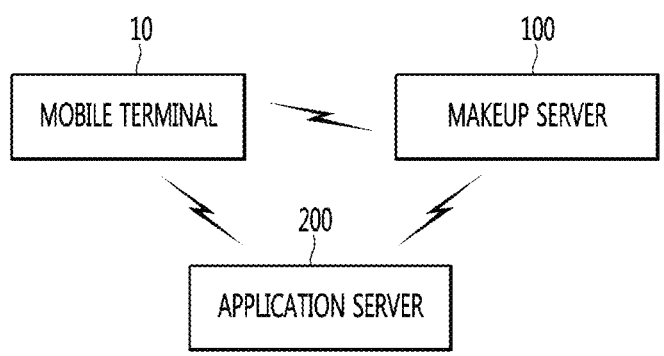
FIG. 1 is a block diagram illustrating a configuration of a makeup evaluation system according to an embodiment of the present invention.

Hereinafter, embodiments will be described in detail with reference to the accompanying drawings, however, the same elements are designated by the same reference numerals, and repeated description thereof will be omitted. Suffixes "module" and "part" for elements used in the following descriptions are given or used just for convenience in writing the specification, and do not have meanings or roles distinguishable between them. In addition, in describing embodiments of the present disclosure, when detailed description of a known function is deemed to unnecessarily blur the gist of the present disclosure, the detailed description will be omitted. Further, accompanying drawings are only for easily understanding embodiments disclosed in the present disclosure, and the technical spirit disclosed in the present disclosure are not limited by the accompanying drawings, and it should be understood that the present invention includes all modifications, equivalents, and alternatives falling within the spirit and scope of the claims.

It should be understood that, although the terms first, second, and the like may be used herein to describe various elements, these elements are not limited by these terms. The terms are only used to distinguish one element from another.

It should be understood that, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present.

Elements referred to in singular may be number one or more, unless the context clearly shows otherwise.

It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Next, a makeup evaluation system and an operation method thereof according to an embodiment of the present invention will be described with reference to FIGS. 1 to 40.

First, FIG. 1 is a block diagram illustrating a configuration of a makeup evaluation system according to an embodiment of the present invention.

Referring to FIG. 1, the makeup evaluation system according to an embodiment of the present invention may include a mobile terminal 10, an application server 200, and a makeup server 100.

The mobile terminal 10 may request a makeup evaluation. The mobile terminal 10 may request the makeup evaluation in association with at least one makeup image, and may display a makeup evaluation result.

The application server 200 may be an element used for an application operation for the makeup evaluation, and may store information necessary for the application operation for the makeup evaluation.

The application server 200 may transmit and receive a signal and data to/from at least one of the mobile terminal 10 and the makeup server 100 according to execution of the makeup evaluation application.

The makeup server 100 may store data necessary for the makeup evaluation. For example, the makeup server 100 may store a data for identifying each face part, an evaluation algorithm for evaluating makeup, and the like.

The makeup server 100 may evaluate the makeup based on the stored data, or transmit information necessary for the makeup evaluation to the mobile terminal 10 or the application server 200. The makeup server 100 may transmit an evaluation result signal including evaluation result information of the makeup to the mobile terminal 10.

The mobile terminal 10, the application server 200, and the makeup server 100 may transmit and receive signals to/from each other.

The mobile terminal 10 may transmit a makeup evaluation request signal to the application server 200, and when the application server 200 receives the makeup evaluation request signal, it is possible to transmit a makeup image corresponding to the received makeup evaluation request signal to the makeup server 100.

According to one embodiment, when the makeup server 100 receives the makeup evaluation request signal, it is possible to evaluate makeup of a received image based on the stored data and transmit an evaluation result to the application server 200. The application server 200 may transmit the evaluation result to the mobile terminal 10.

However, according to the embodiment, the application server 200 and the makeup server 100 may transmit and receive signals to/from the mobile terminal 10 as a single server, not separately. For example, the application server 200 may be included in the makeup server 100. In this case, the mobile terminal 10 may transmit the makeup evaluation request signal to the makeup server 100, and the makeup server 100 may evaluate the makeup to transmit an evaluation result data to the mobile terminal 10.

According to another embodiment, when the makeup server 100 receives a makeup evaluation request signal, it transmits data related to the received makeup evaluation request signal to the mobile terminal 10, and the mobile terminal 10 evaluates the makeup based on the received data.

The mobile terminal 10 described in the present disclose may include a mobile phone, a smart phone, a computer, a notebook computer, a tablet PC, a wearable device, a digital TV, a digital signage, a display device provided in a store selling beauty-related products such as cosmetics, and a smart mirror provided in a home or a store.

Figure 2:
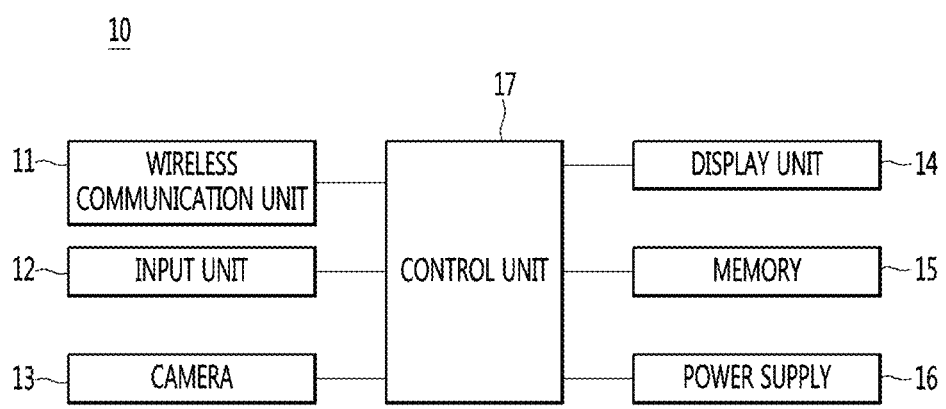
FIG. 2 is a block diagram for describing a mobile terminal according to an embodiment of the present invention.

FIG. 2 is a block diagram for describing a mobile terminal according to an embodiment of the present invention.

A mobile terminal 10 may include a wireless communication unit 11, an input unit 12, a camera 13, a display unit 14, a memory 15, a power supply unit 16, and a control unit 17. As described above, elements shown in FIG. 2 are illustrative elements to help in understanding of the mobile terminal according to the present invention. The mobile terminal may have more or fewer elements than the elements listed above.

Hereinafter, each of the elements of the mobile terminal 10 will be described in more detail.

The wireless communication unit 11 may include one or more modules for enabling wireless communication between the mobile terminal 10 and another mobile terminal 10, or between the mobile terminal 100 and an external server. Specifically, the wireless communication unit 11 may include at least one of a broadcast receiving module, a mobile communication module, a wireless internet module, a short distance communication module, and a location information module.

The wireless communication unit 11 may transmit and receive signals to/from the another mobile terminal 10 or the external server. For example, the wireless communication unit 11 may transmit and receive signals to/from at least one of an application server 200 and a makeup server 100.

The input unit 12 may receive data or an instruction from a user. The input unit may receive an input signal via a mechanical key, a touch key, voice recognition, or the like. The data or the instruction received via the input unit 12 may be processed as a control instruction to transmit to another element.

The camera 13 may receive a video signal input. A video signal includes a still image such as a photograph, a moving image, and the like. Accordingly, the camera 13 may receive the video signal input by photographing the photograph, the moving image, or the like. For example, the camera 13 may photograph a facial image of the user.

The display unit 14 displays (outputs) information processed by the mobile terminal 10. For example, the display unit 14 may display a content received via the wireless communication unit 11, a content input via the input unit 12, or the like on a screen as the content provided to the user. In addition, the display unit 14 may display screen information of an application program driven by the mobile terminal 10.

Alternatively, the display unit 14 may display an image that is being photographed or photographed via the camera 13. For example, the display unit 14 may display the facial image photographed via the camera 13.

In addition, the display unit 14 may display result information of evaluating the makeup based on the photographed facial image.

Meanwhile, the display unit 151 may form a mutual layer structure with a touch sensor or may be integrally formed, thereby realizing a touch screen. Such a touch screen may function as the input unit 12 and may provide an output interface between the mobile terminal 10 and the user.

The memory 15 stores data supporting various functions of the mobile terminal 10. The memory 15 may store a plurality of application programs or applications driven at the mobile terminal 10, data for operation of the mobile terminal 10, and instructions. At least a part of the applications may be downloaded from the external server via the wireless communication. Alternatively, at least a part of the application programs may be present on the mobile terminal 10 at a time of shipment for basic functions (e.g., incoming call, outgoing call function, message receiving and sending function) of the mobile terminal 10.

Meanwhile, at least one of the application programs may be an application for the makeup evaluation.

The power supply unit 16 receives external power or internal power and supplies power to each of the elements included in the mobile terminal 10. The power supply unit 190 may include a battery, and the battery may be an internal battery or a replaceable battery.

The control unit 17 controls an overall operation of the mobile terminal 10. Specifically, the control unit 17 may control an operation of each of the elements configuring the mobile terminal 10 or the operation related to the application program. The control unit 17 may process signals, data, information, etc. input or output via the elements, or may drive the application program stored in the memory 15 to provide or process appropriate information or a function to the user. The control unit 17 may control at least a part of the elements, or may combine at least two of them with each other to operate.

At least a part of the elements described with reference to FIG. 2 may operate in cooperation with each other to realize an operation, a control, or a control method of a mobile terminal according to various embodiments will be described below. In addition, the operation, the control or the control method of the mobile terminal may be realized on the mobile terminal by driving of at least one application program stored in the memory 15.

Figure 3:
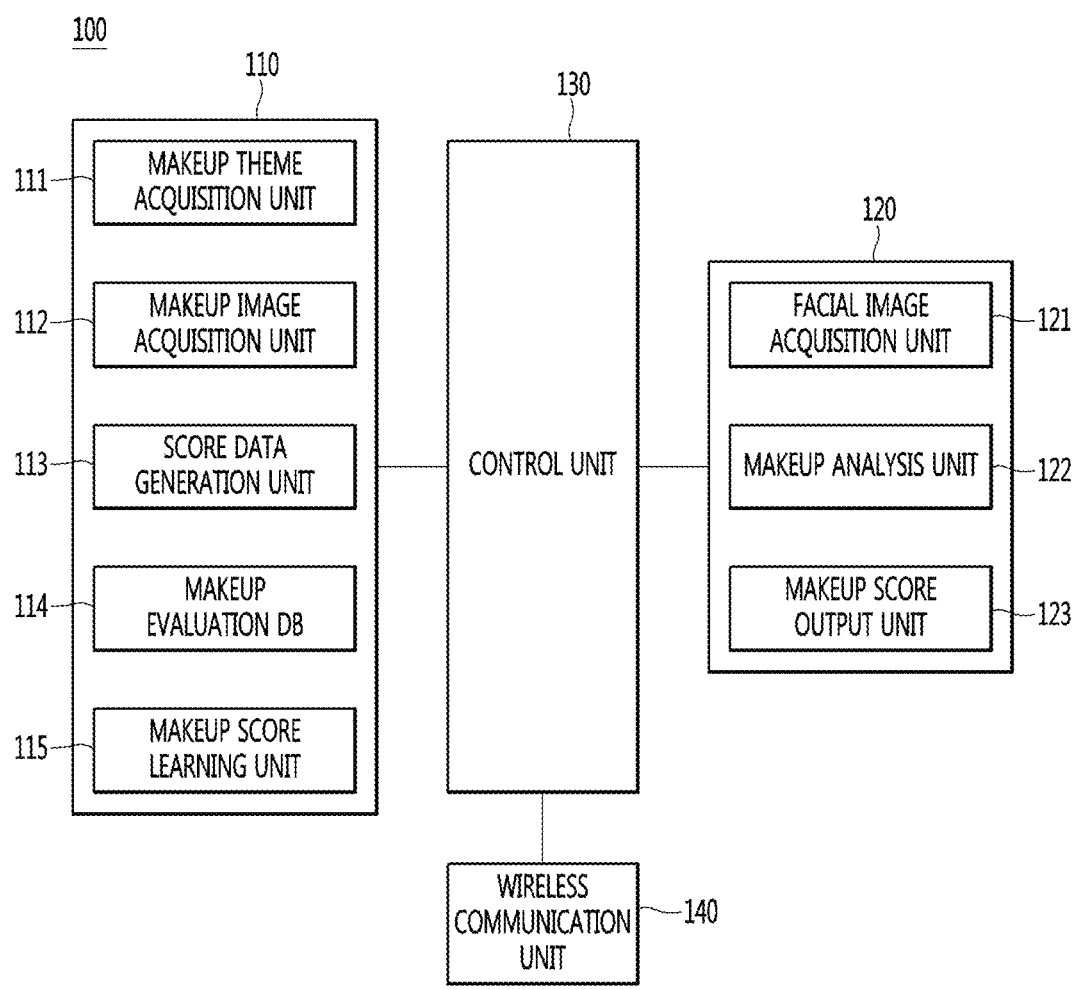
FIG. 3 is a block diagram for describing a makeup server according to a first embodiment of the present invention.

Next, FIG. 3 is a block diagram for describing a makeup server according to a first embodiment of the present invention.

A makeup server 100 may be composed of a makeup DB management unit 110, a makeup evaluation unit 120, a control unit 130, and a wireless communication unit 140.

First, the makeup DB management unit 110 will be described.

The makeup DB management unit 110 may include a makeup theme acquisition unit 111, a makeup image acquisition unit 112, a score data generation unit 113, a makeup evaluation DB 114, and a makeup score learning unit 115.

The makeup theme acquisition unit 111 determines a makeup theme through data analysis or a user input. The overall balance of makeup is important. In addition, the makeup that is in vogue changes according to the trend of the times. Accordingly, the makeup theme acquisition unit 111 may acquire a makeup theme by analyzing data existing on-line. Alternatively, the makeup theme acquisition unit 111 may receive a makeup theme input from a user to acquire the makeup theme.

The makeup image acquisition unit 112 receives a plurality of pieces of makeup image data which is the basis of makeup evaluation. Specifically, the makeup image acquisition unit 112 may receive a plurality of pieces of makeup image data classified according to the makeup theme. In addition, the makeup image acquisition unit 112 may acquire a no makeup image together with a makeup image for the theme.

The makeup image received via the makeup image acquisition unit 112 may be stored in the makeup evaluation DB 114.

The score data generation unit 113 generates makeup score data including a makeup image and a corresponding makeup score thereto. The makeup image of the makeup score data may be received via the makeup image acquisition unit 112. The makeup score of the makeup score data may be formed based on an evaluation of a makeup specialist. Specifically, the makeup score data may be generated based on an input for the makeup evaluation of the makeup specialist. For example, the makeup score may be input by the makeup specialist for each facial image. In addition, the makeup score may include a score calculated by the makeup server 100 itself by machine learning.

In addition, the score data generation unit 113 may tune the makeup score data to lower an error rate of the makeup evaluation system. In addition, the score data generation unit 113 may correct reliability of the makeup score data to acquire the objectivity of the makeup evaluation system.

The makeup evaluation DB 114 stores the makeup score data generated via the score data generation unit 113. The makeup score data may be tuned, or the reliability thereof may be corrected.

In addition, the makeup evaluation DB 114 may store, together with the makeup score data generated via the score data generation unit 113, the score data calculated in association with a new image. In this way, the makeup score learning unit 115 may perform a machine learning of a makeup score calculation method by using the makeup evaluation DB 114 storing the makeup score data.

The makeup score learning unit 115 performs the machine learning of the makeup score calculation method based on the makeup evaluation DB 114. Specifically, the makeup score learning unit 115 may perform the machine learning of the makeup score calculation method so as to be similar to a method that a makeup specialist actually evaluates.

Next, the makeup evaluation unit 120 will be described in detail.

The makeup evaluation unit 120 may include a facial image acquisition unit 121, a makeup analysis unit 122, and a makeup score output unit 123.

The facial image acquisition unit 121 receives a facial image to be subjected to makeup evaluation. Specifically, the facial image acquisition unit 121 may receive the facial image to be subjected to the makeup evaluation via the wireless communication unit 140.

The makeup analysis unit 122 analyzes the makeup of the facial image received by the facial image acquisition unit 121. The makeup analysis unit 122 may analyze the makeup of each face region included in the facial image. For example, the makeup analysis unit 122 may analyze the makeup through a method of comparing image data included in the facial image and the makeup score data. That is, the makeup analysis unit 122 may analyze the makeup based on statistical values of the makeup score data. A detailed method will be described later.

The makeup score output unit 123 calculates a makeup score of the facial image based on a makeup analysis result. The makeup score output unit 123 may calculate a makeup total score and a score for each face region.

The control unit 130 controls the overall operation of the makeup server 100. Specifically, the control unit 130 may control operations of the makeup DB management unit 110, the makeup evaluation unit 120, and the wireless communication unit 140.

The wireless communication unit 140 may transmit and receive data to/from the outside. For example, the wireless communication unit 140 may receive image data from a mobile terminal 10 or an application server 200. The wireless communication unit 140 may transmit the received image data to the makeup DB management unit 110 or the makeup evaluation unit 120.

Meanwhile, embodiments described below may be implemented in a recording medium readable by a computer or a similar device by using, for example, software, hardware, or a combination thereof.

Figure 4:
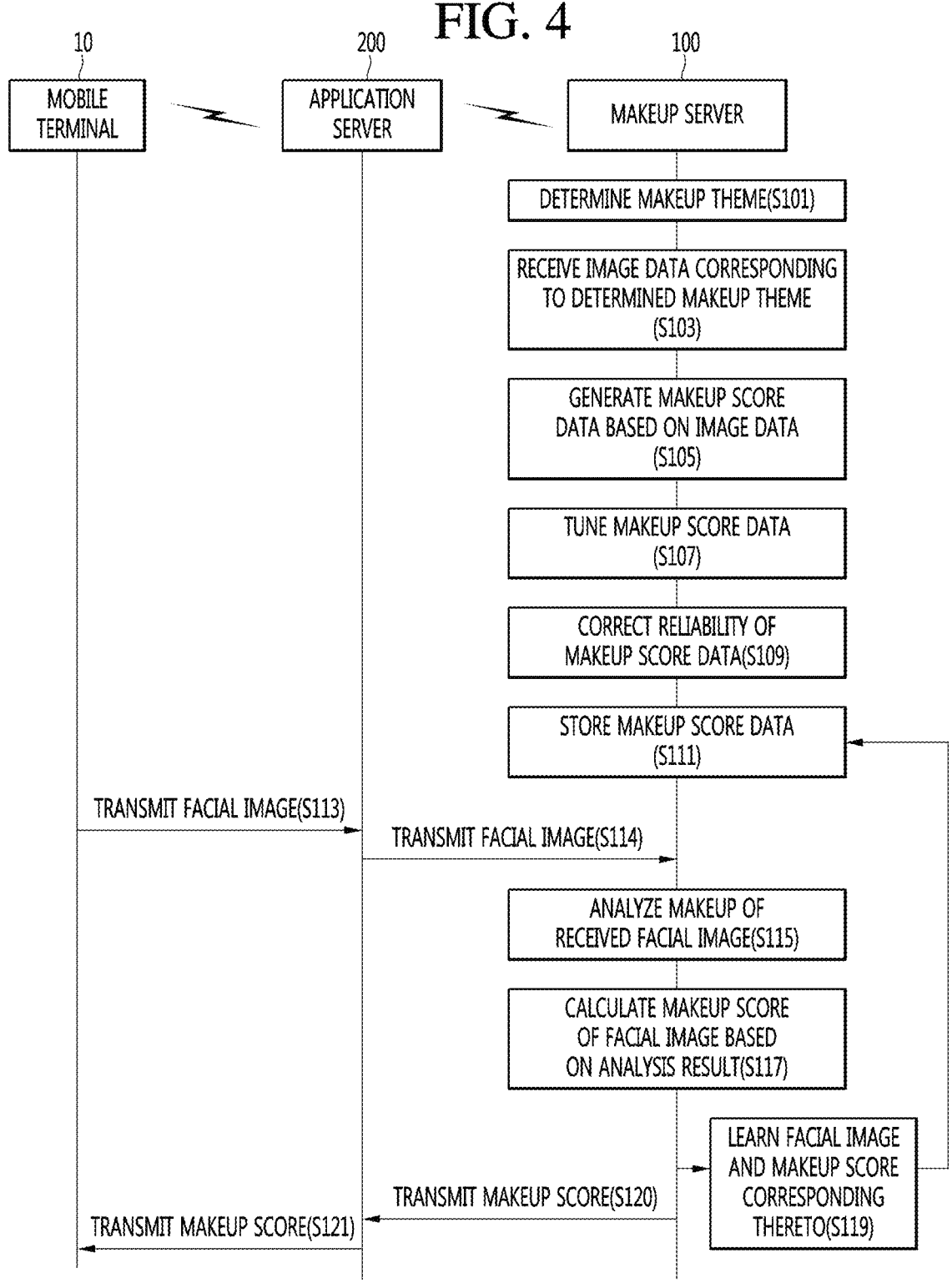
FIG. 4 is a ladder diagram illustrating an operation method of a makeup evaluation system according to the first embodiment of the present invention.

Next, an operation method of a makeup evaluation system according to a first embodiment of the present invention will be described with reference to FIG. 4. FIG. 4 is a ladder diagram illustrating an operation method of the makeup evaluation system according to the first embodiment of the present invention.

First, the makeup theme acquisition unit 111 of the makeup server 100 may determine a theme of makeup (S101).

According to one embodiment of the present invention, the makeup theme acquisition unit 111 may determine the theme of makeup via wireless communication.

Specifically, the makeup theme acquisition unit 111 may acquire beauty-related data on-line. The beauty-related data may include makeup search terms, uploaded makeup-related content, sales volume of makeup products, and the like. The makeup theme acquisition unit 111 may analyze the acquired beauty-related data for each makeup theme to determine the makeup theme based on data amount. For example, the makeup theme acquisition unit 111 may acquire three makeup styles in descending order of data amount to determine the acquired three makeup styles as a makeup theme.

Through such a method, the makeup theme acquisition unit 111 has an effect of easily acquiring a trendy makeup theme.

According to another embodiment of the present invention, the makeup theme acquisition unit 111 may determine the makeup theme by receiving an input signal.

Specifically, a user may input an arbitrary makeup theme to the makeup server 100. The makeup theme acquisition unit 111 may acquire the makeup theme corresponding to the input data to determine the makeup theme.

Through such a method, there is an effect that the makeup server 100 may reflect a makeup theme in vogue off-line.

The makeup theme acquisition unit 111 may determine at least one makeup theme through the first or second embodiment. For example, the makeup theme acquisition unit 111 may determine A makeup, B makeup, and C makeup. A makeup may be a natural makeup, B makeup may be a lovely makeup, and C makeup may be a smoky makeup, but this is merely illustrative.

An embodiment for determining the makeup theme described above is illustrative, and the makeup theme acquisition unit 111 may determine the makeup theme through other methods.

Meanwhile, the makeup theme acquisition unit 111 may acquire makeup criteria together when acquiring the makeup theme. The makeup criteria may refer to at least one feature that distinguishes makeup for the makeup theme. The makeup criteria may be subsequently used as a guideline in a step of receiving image data and a step of analyzing the makeup.

Next, the makeup image acquisition unit 112 may receive image data corresponding to a determined makeup theme (S103).

The makeup image acquisition unit 112 may receive image data corresponding to a makeup theme from the outside. For example, the makeup image acquisition unit 112 may receive image data corresponding to a makeup theme from an external storage medium, a mobile terminal, or an external server.

The makeup image acquisition unit 112 may receive a plurality of pieces of makeup image data for each makeup theme. For example, the makeup image acquisition unit 112 may receive image data corresponding to A makeup, image data corresponding to B makeup, and image data corresponding to C makeup.

Meanwhile, the makeup image acquisition unit 112 may classify and receive image data by a group. That is, the makeup image acquisition unit 112 may receive the makeup theme image data from each group classified into a plurality of groups.

Next, FIG. 5 is an illustrative view for describing a method of receiving image data by a makeup server according to an embodiment of the present invention.

An image classification table 500 shown in FIG. 5 shows a distribution of the image data received via the makeup image acquisition unit 112. A1 to A5, B1 to B5, C1 to C5 and D1 to D5 refer to a set of the received image data.

Specifically, A1, A2, B1, B2, C1, C2, D1, and D2 are sets of image data corresponding to a first group, and are sets of image data received to form a bottom category (lower, middle and lower) of the makeup evaluation DB.

A3, A4, B3, B4, C3, C4, D3 and D4 are sets of image data corresponding to a second group, and are sets of image data received to form a middle category (middle, middle and upper) of the makeup evaluation DB.

A5, B5, C5, and D5 are sets of image data corresponding to a third group, and are sets of image data received for constructing a top category (upper) of the makeup evaluation DB.

Thus, the makeup image acquisition unit 112 may acquire the A makeup image, the B makeup image, the C makeup image, and the no makeup image of each of the people included in the first through third groups having different scores. The A makeup image, the B makeup image, and the C makeup image are image data which are the basis of the makeup theme evaluation, respectively. The no makeup image may be image data used for processing the bottom point in a step of analyzing the makeup.

The first group may represent the general public, the second group may represent a beauty-related industry person, and the third group may represent a makeup specialist, but this is merely illustrative.

Thus, when the image data is classified and received by the makeup theme and group, there is an effect that a makeup analysis is more accurately performed. In addition, there is an effect of providing a guideline capable of analyzing and evaluating the makeup accurately in consideration of a photographing angle, a lighting, and the like, which are control variables that may affect the makeup analysis.

Meanwhile, the makeup image acquisition unit 112 may receive a makeup image other than the A makeup, the B makeup, and the C makeup. That is, the makeup image acquisition unit 112 may acquire a makeup image of a theme different from a determined makeup theme. This is image data for processing makeup that is out of the theme or is broken in balance regardless of the completion of makeup as a zero-point.

FIG. 4 will be described again.

The score data generation unit 113 may generate makeup score data based on the received image data (S105).

The score data generation unit 113 may generate the received image data and score data including a score corresponding to each image data. That is, the score data generation unit 113 may convert the image data into the score data.

Next, FIG. 6 is an illustrative view for describing makeup score data according to the first embodiment of the present invention.

Makeup score data 600 shown in FIG. 6 includes image data and scores corresponding to each image data. The score corresponding to the image data may be subdivided by region. For example, as shown in FIG. 6, each image data may include a score for each of the regions which are a base region, an eyebrow region, an eye region, a lip region, a blusher and shading region. However, each region is merely illustrative.

The makeup score data 600 shown in FIG. 6 shows only two pieces of image data corresponding to the A makeup and scores corresponding thereto, but the score data generation unit 113 generates score data including all the image data received in step S103.

The score data generation unit 113 may generate score data by receiving a score input for a region corresponding to each image data. For example, at least one makeup specialist may input a score for each region of the image data to the makeup server 100. The score data generation unit 113 may generate makeup score data based on the score data input to the makeup server 100. The makeup score data shown in FIG. 6 is displayed as a numerical value such as 5, 3.5, 4, etc., but this is merely illustrative, and the makeup score data may be divided into upper, middle and upper, middle, middle and lower, lower, and so on.

The makeup score data 600 represents features of makeup for each makeup theme. Specifically, the makeup score data 600 represents different scores depending on the theme of makeup, even for the same makeup image. In addition, even if the same makeup is applied, the score changes depending on the face shape, eyes, etc. included in the image. Therefore, the makeup score data 600 includes a plurality of pieces of makeup image data, and includes scores for each region distinguished according to a makeup theme.

When the makeup score data 600 is used, in the case of makeup image data that is not related to the makeup theme, the score corresponding thereto may be calculated to be zero point.

Thus, when the makeup image is received and the score data is generated, the score data based on the evaluation of the specialist may be generated. Accordingly, reliability of the makeup evaluation is improved. In addition, makeup-related big data may be constructed.

FIG. 4 will be described again.

The score data generation unit 113 may tune makeup score data (S107).

The score data generation unit 113 may tune the makeup score data to improve reliability of the generated makeup score data. More specifically, the score data generation unit 113 may tune the score data so as to calculate the same makeup score, when a plurality of facial images are photographed at different photographing angles or illumination. A method of tuning the makeup score data may be as follows.

In association with the first image data received in step S103, the makeup image acquisition unit 112 may re-receive second image data corresponding to the first image data. The second image data may be image data different from the first image data, and may include a newly produced makeup image and a newly photographed no makeup image. That is, the second image data may refer to image data that is the same as the first image data in that it is a makeup performed by the same person, but may be recognized as different makeups depending on photographing angles or illumination, or the like.

Therefore, the score data generation unit 113 may tune the makeup score data such that a score calculated by the first image data and a score calculated by the second image data are the same.

Next, referring to FIGS. 7 and 8, an operation of tuning makeup score data will be described as an example.

Figure 7:
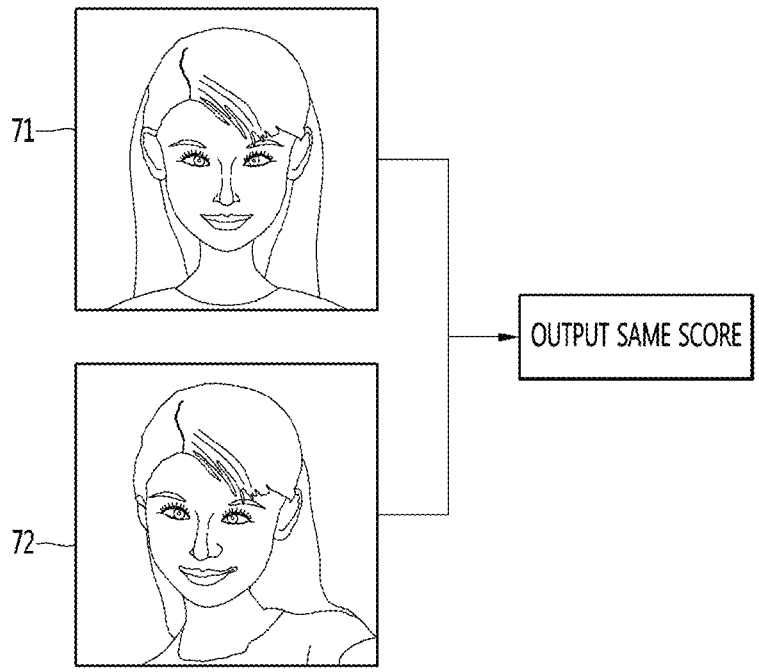
FIGS. 7 and 8 are illustrative views for describing a method of tuning the makeup score data according to the first embodiment of the present invention.
Figure 8:
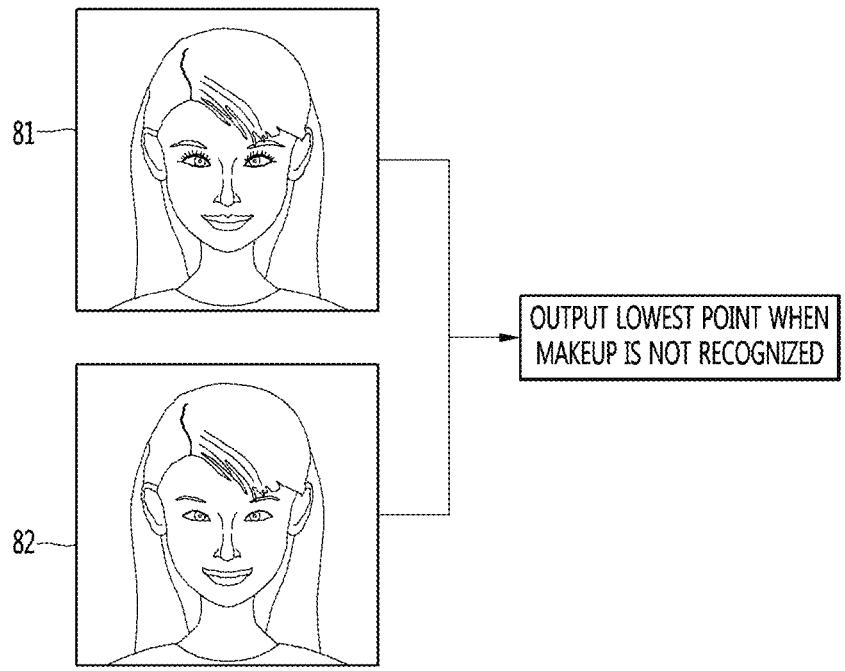

FIGS. 7 and 8 are illustrative views for describing a method of tuning makeup score data according to a first embodiment of the present invention.

First, referring to FIG. 7, first image data 71 and second image data 72 are images of similar makeups. However, the first image data 71 and the second image data 72 are photographed at different photographing angles. A score data generation unit 113 may tune the makeup score data such that a score calculated by the first image data 71 and a score calculated by the second image data 72 are equal.

For example, the score data generation unit 113 may form the first image data 71 and the second image data 72 into one group to tune the same score to be calculated. Alternatively, the score data generation unit 113 may adjust the score calculated by the first image data 71 and the score calculated by the second image data 72 to be equal through the image data tuning.

Next, referring to FIG. 8, first image data 81 is makeup image data, and second image data 82 is no makeup image data of the same person. In this case, a score data generation unit 113 may tune makeup score data such that a score calculated for the second image data 82 is the lowest point.

Specifically, the score data generation unit 113 may recognize makeup of the first image data 81 and the second image data 82, respectively. The score data generation unit 113 may calculate a score of the makeup recognized based on makeup score data 600 when the makeup is recognized as in the first image data 81. On the other hand, when the makeup is not recognized as in the second image data 82, the score data generation unit 113 may tune the makeup score data so as to calculate the lowest point.

As described above, there is an effect that quality of a makeup evaluation system may be improved by tuning the makeup score data such that the score data generation unit 113 reflects image data, a photographing angle, an illumination at the time of photographing, identification of no makeup, etc.

FIG. 4 will be described again.

The score data generation unit 113 may correct reliability of makeup score data (S109).

The control unit 130 may receive new image data not included in the makeup score data. The score data generation unit 113 may determine whether a score of the received new image data is calculated without error based on the makeup score data. Hereinafter, a specific method of correcting the reliability of the makeup score data will be described.

According to an embodiment of the present invention, a score data generation unit 113 may calculate a makeup score corresponding to a new image, and may acquire an image similar to the new image from makeup score data.

The score data generation unit 113 may determine whether a score corresponding to the new image is calculated within a predetermined error rate with the score of the similar image included in the makeup score data. The score data generation unit 113 may correct a score of related image data included in the makeup score data based on a determination result.

Alternatively, according to another embodiment of the present invention, a score data generation unit 113 may acquire a first score which is a makeup score corresponding to a new image calculated based on makeup score data. In addition, the score data generation unit 113 may acquire a second score which is a makeup score corresponding to a new image based on an input for makeup evaluation of a makeup specialist.

The score data generation unit 113 may compare the first score and the second score acquired in association with the same image. As a result of comparison, the score data generation unit 113 may determine whether the first score and the second score are different from each other by a predetermined range or more.

The score data generation unit 113 may receive feedback corresponding to the comparison result from the makeup specialist when the first score and the second score are different from each other by the predetermined range or more.

The feedback may include a reason for a gap between the first score and the second score. For example, the feedback may include information for correcting the first score or the second score, image recognition information, or opinion information of the makeup specialist.

The score data generation unit 113 may correct the score of the image data included in the makeup score data based on the received feedback.

The method for correcting the reliability of the makeup score may further include other methods in addition to the first to second embodiments exemplified above.

The present invention has an effect that an error rate of the makeup score data may be lowered and the reliability may be improved by correcting the makeup score as described above.

The control unit 130 may store the makeup score data (S111).

The control unit 130 may store the generated makeup score data. In addition, it is possible to store the makeup score data that has been tuned or corrected for reliability.

First, a makeup evaluation database according to an embodiment of the present invention will be described.

As described with reference to FIG. 6, a makeup evaluation database according to an embodiment of the present invention may store makeup score data for each facial image. Accordingly, the makeup evaluation database may be formed such that a makeup facial image and a score for each region corresponding thereto are arranged.

Next, a makeup evaluation database according to another embodiment of the present invention will be described with reference to FIG. 9.

As shown in FIG. 9, the makeup evaluation database according to another embodiment of the present invention may store such that partial images are arranged by dividing a face region and a score. Accordingly, the makeup evaluation database may be formed such that the face region is divided, the score is subdivided for each face region, and the partial images are arranged in the score of the subdivided face region.

The makeup evaluation database described above is illustrative and may be formed in a different form.

FIG. 4 will be described again.

The makeup server 100 may evaluate a makeup image by forming a makeup evaluation database.

First, the mobile terminal 10 transmits a facial image to the application server 200 (S113), and the application server 200 may transmit the facial image received from the mobile terminal 10 to the makeup server 100 (S113).

The wireless communication unit 140 of the makeup server 100 may receive the facial image from the application server 200.

The mobile terminal 10 may transmit a makeup evaluation request signal to the application server 200 via a makeup evaluation application. The mobile terminal 10 may display a screen for transmitting the makeup evaluation request signal.

Figure 10:
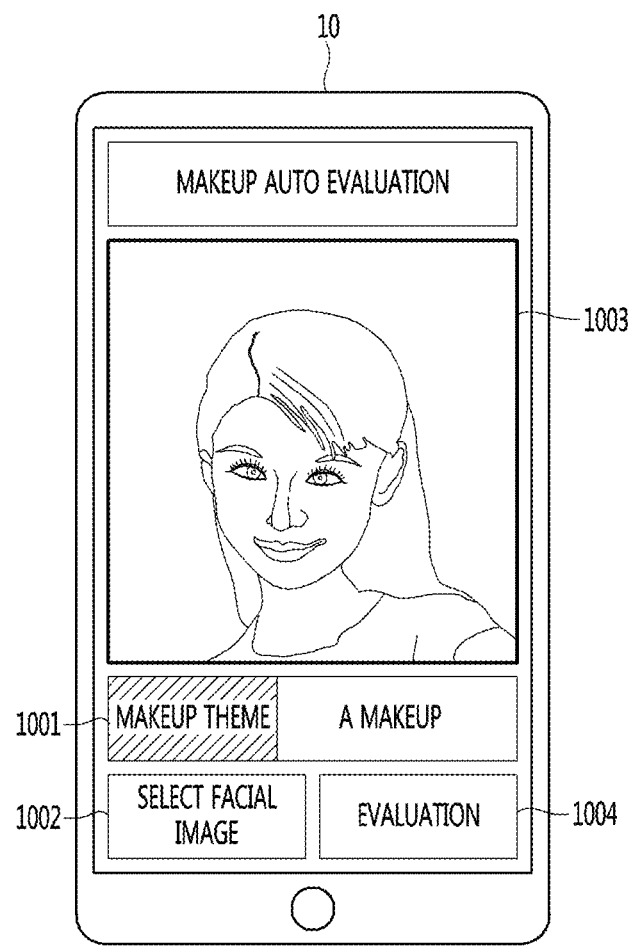
FIG. 10 is an illustrative view for describing a screen for transmitting a request signal of a makeup evaluation according to the first embodiment of the present invention.

FIG. 10 is an illustrative view for describing a screen for transmitting a makeup evaluation request signal according to a first embodiment of the present invention.

A display unit 14 of a mobile terminal 10 may display a makeup evaluation request screen as shown in FIG. 10.

Referring to FIG. 10, the makeup evaluation request screen may include a makeup theme item 1001, a facial image selection icon 1002, a facial image window 1003, and an evaluation icon 1004.

The makeup theme item 1001 is an item for selecting a makeup theme. Makeup evaluation may vary depending on the makeup theme. Accordingly, a control unit 17 of the mobile terminal 10 may set the makeup theme via the makeup theme item 1001.

The facial image selection icon 1002 is an item for selecting a facial image to request a makeup evaluation. According to one embodiment of the present invention, the control unit 17 of the mobile terminal 10 may control the display unit 14 so as to display a photographing screen using a camera 13 when an instruction to select the facial image selection icon 1002 is received. The camera 13 may photograph a face on which makeup is applied. The control unit 17 may display the photographed facial image on the facial image window 1003.

According to another embodiment of the present invention, a control unit 17 of a mobile terminal 10 may display at least one still image stored in a memory 15 when an instruction to select a facial image selection icon 1002 is received. Alternatively, the control unit 17 may identify an image including a face from the still image stored in the memory 15 to display the still image including at least one face. The control unit 17 may receive an instruction to select any one facial image from at least one still image displayed on a display unit 14. The control unit 17 may display the selected facial image on a facial image window 1003.

The facial image window 1003 is a window for previewing a facial image for which makeup evaluation is requested. Any one of the facial images photographed via a camera 13 or stored in the memory 15 may be displayed in the facial image window 1003. A user may confirm whether the face to be requested for the makeup evaluation is correct via the facial image window 1003.

An evaluation icon 1004 is an icon for executing a makeup evaluation request. When an instruction to select the evaluation icon 1004 is received, the control unit 17 may transmit a makeup evaluation request signal to an application server 200. That is, the control unit 17 may control a wireless communication unit 11 to transmit the makeup evaluation request signal including the facial image to the application server 200.

The application server 200 may transmit the makeup evaluation request signal to a makeup server 100. Accordingly, a wireless communication unit 140 of the makeup server 100 may receive the makeup evaluation request signal including the facial image from the application server 200.

According to an embodiment, a mobile terminal 10 may transmit a makeup evaluation request signal directly to a makeup server 100.

The makeup evaluation request signal may further include a makeup theme, user information, and the like in addition to the facial image.

FIG. 4 will be described again.

The makeup analysis unit 122 of the makeup server 100 may analyze makeup of a received facial image (S115).

The facial image acquisition unit 121 may receive the facial image from the wireless communication unit 140. The makeup analysis unit 122 may analyze the makeup of the facial image received by the facial image acquisition unit 121.

Figure 11:
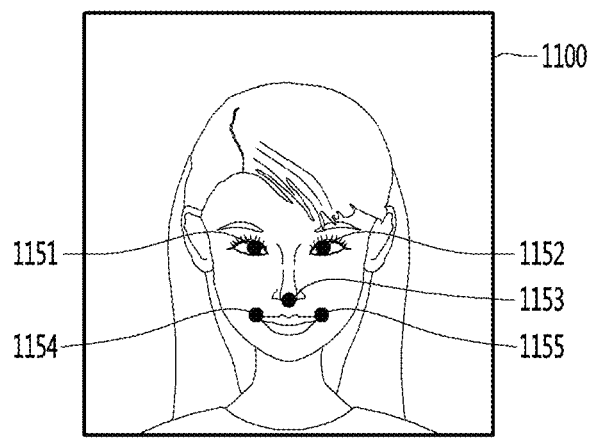
FIG. 11 is an illustrative view for describing a method of analyzing a facial image by the makeup server according to the first embodiment of the present invention.

Next, FIG. 11 is an illustrative view for describing a method of analyzing a facial image by a makeup server according to a first embodiment of the present invention.

A makeup analysis unit 122 may detect each region of a face to analyze makeup. Specifically, according to one embodiment of the present invention, the makeup analysis unit 122 may preprocess a received facial image. The makeup analysis unit 122 may divide the preprocessed facial image into a plurality of regions, and may compare the divided regions with pre-stored face region images to detect eyes, nose, mouth, and the like.

According to another embodiment of the present invention, a makeup analysis unit 122 may recognize each region of a face by using a pre-trained model. The pre-trained model utilizes a part of a conventional convolutional neural network (CNN) model. The pre-trained model may be used to learn a facial picture to recognize eyes, nose, mouth, and the like. Using the pre-trained model, it is possible to reduce a problem of overfitting that may occur when an amount of data used for analysis is small.

As shown in FIG. 11, the makeup analysis unit 122 may recognize eye regions 1151 and 1152, a nose region 1153, and mouth regions 1154 and 1155 of a facial image 1100. The makeup analysis unit 122 may analyze a makeup evaluation region based on the recognized eye regions, nose region, and mouth regions. That is, the makeup analysis unit 122 may analyze a base, eyebrow, eyes, lips, blusher and shading makeup of the facial image 1100.

Figure 12:
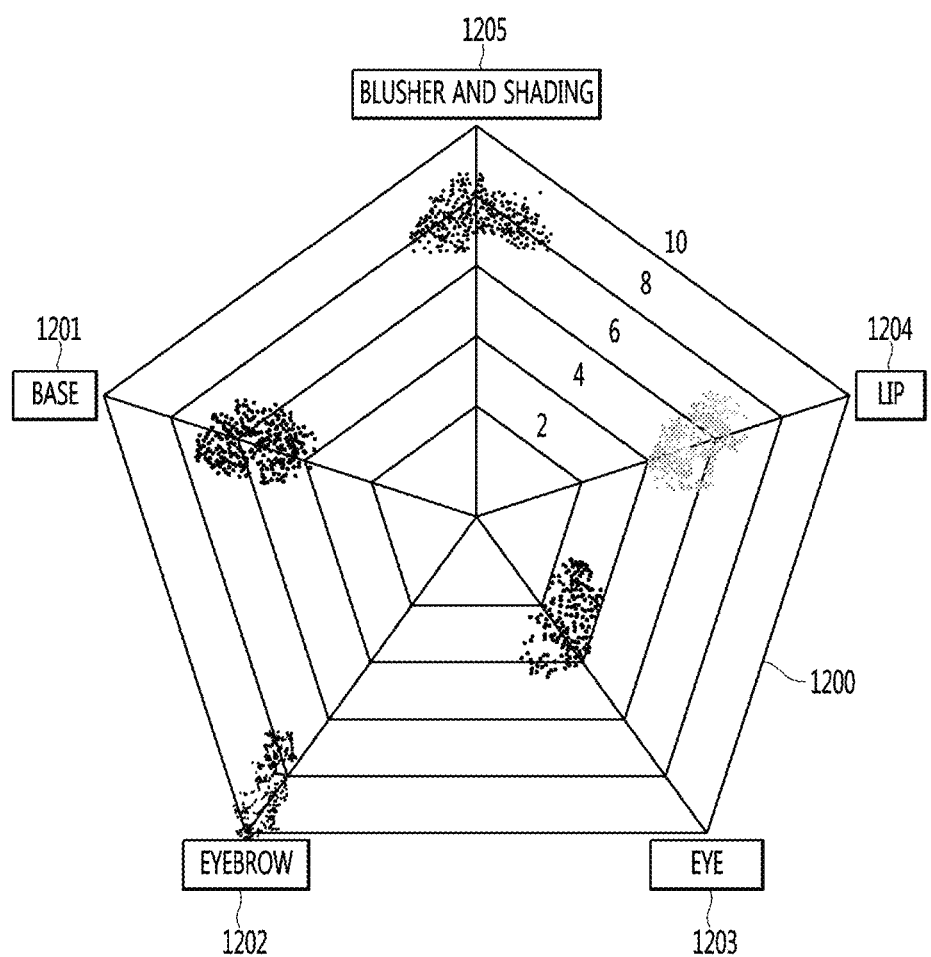
FIG. 12 is an illustrative view for describing a method of analyzing a facial image by a makeup analysis unit according to the first embodiment of the present invention.

Next, FIG. 12 is an illustrative view for describing a method of analyzing makeup of a facial image by a makeup analysis unit according to a first embodiment of the present invention.

A makeup analysis unit 122 may compare the facial image received from a mobile terminal 10 with a plurality of images included in a makeup evaluation database 114. The makeup analysis unit 122 may extract at least one piece of image data similar to the received facial image from the makeup evaluation database 114.

In particular, the makeup analysis unit 122 may extract image data similar to the received facial image for each makeup region. Specifically, the makeup analysis unit 122 extracts at least one piece of image data including a base similar to the base of the facial image, and at least one piece of image data including an eyebrow similar to the eyebrow of the facial image.

The makeup analysis unit 122 may acquire a score corresponding to the extracted image data to generate a makeup analysis graph 1200 as shown in FIG. 12. The makeup analysis graph 1200 shows a score distribution of the extracted image data.

Specifically, the makeup analysis unit 122 may map a score acquired in association with at least one piece of image data extracted with a similar base to a score region of a base region 1201. Likewise, the makeup analysis unit 122 may map a score acquired in association with at least one piece of image data extracted with similar eyebrows to a score region of an eyebrow region 1202. The makeup analysis unit 122 may generate the makeup analysis graph 1200 by mapping scores to all of an eye region 1203, a lip region 1204, and a blusher and shading region 1205.

In this manner, the makeup analysis unit 122 may generate the makeup analysis graph 1200 to analyze makeup of the facial image. However, it is illustrative and the makeup analysis unit 122 may analyze the makeup through other methods.

FIG. 4 will be described again.

The makeup score output unit 123 of the makeup server 100 may calculate a makeup score of a facial image based on a makeup analysis result (S117).

The makeup score output unit 123 may calculate the makeup score of the facial image based on a makeup analysis graph 1200.

Specifically, the makeup score output unit 123 may calculate and acquire a score having the highest score mapped for each region in the makeup analysis graph 1200.

For example, referring to FIG. 12, the makeup score output unit 123 may calculate and acquire 5 points for a score of a base region 1201, 9 points for a score of an eyebrow region 1202, and 3 points for a score of an eye region 1203, 4.5 points for a score of a lip region 1203, 8 points for a score of a blusher and shading region 1205.

The makeup score learning unit 115 of the makeup server 100 may learn the facial image and the makeup score corresponding thereto (S119).

The makeup score learning unit 115 may machine learn the facial image and the makeup score corresponding thereto. In particular, the makeup score learning unit 115 may learn a method of calculating the makeup score by using deep learning technology.

The deep learning technology is a part of machine learning technology, which uses artificial neural network techniques in which several layers of artificial neurons are stacked and connected between input and output.

That is, the makeup score learning unit 115 may machine learn the method of calculating the makeup score by using the pre-stored makeup score data and the calculated makeup score.

In particular, the makeup score learning unit 115 may learn the facial image and the makeup score corresponding thereto by using a convolutional neural network (CNN). The CNN consists of one or several convolutional layers and general artificial neural network layers stacked thereon, and further utilizes weights and pooling layers. Because of this structure, the CNN may fully utilize input data of a two-dimensional structure.

The makeup score learning unit 115 may machine learn the method of calculating the makeup score by adding a feature of a newly recognized facial image to the existing makeup evaluation database 114 by using the convolutional neural network.

Therefore, the makeup score learning unit 115 may machine learn the method of calculating the makeup score by adding a score of a newly calculated facial image to the existing makeup score data generated based on an input for makeup evaluation of a makeup specialist.

As described above, when the makeup score learning unit 115 learns the makeup score, there is an effect that it is possible to evaluate similarly to an actual evaluation of the makeup specialist when a new makeup image is given. Thus, there is an effect that it is possible to provide a more reliable makeup evaluation service to a user.

The makeup score learning unit 115 may control so as to store the learned makeup score in the makeup evaluation database.

Next, FIG. 13 is an illustrative view for describing a regenerated makeup evaluation database according to a first embodiment of the present invention.

The regenerated makeup evaluation database will be described using the makeup evaluation database 114 according to an embodiment described above.

As shown in FIG. 13, the makeup evaluation database 114 may further store a newly calculated facial image score data 1302 in existing data 1301 based on evaluation of a makeup specialist.

A control unit 130 may calculate a more objective makeup score by adding a newly calculated facial image score data to the makeup evaluation database 114.

FIG. 4 will be described again.

The wireless communication unit 140 of the makeup server 100 transmits a calculated makeup score to the application server 200 (S120), and the application server 200 may transmit a received makeup score to the mobile terminal 10 (S121).

The wireless communication unit 11 of the mobile terminal 10 may receive a makeup score from the application server 200. According to an embodiment, the mobile terminal 10 may receive the makeup score directly from the makeup server 100.

The display unit 14 of the mobile terminal 10 may display the received makeup score.

Next, FIGS. 14A and 14B and FIGS. 15 to 18 are illustrative views for describing makeup scores according to various embodiments of the present invention.

Figure 14A:
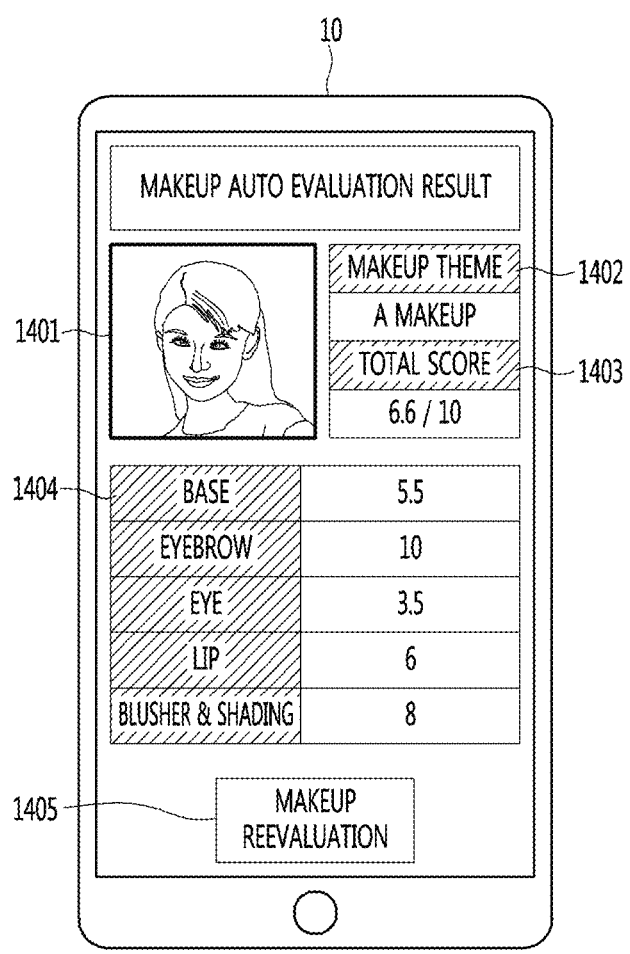
FIGS. 14A and 14B are illustrative views for describing a makeup score screen according to the first embodiment of the present invention.
Figure 14B:
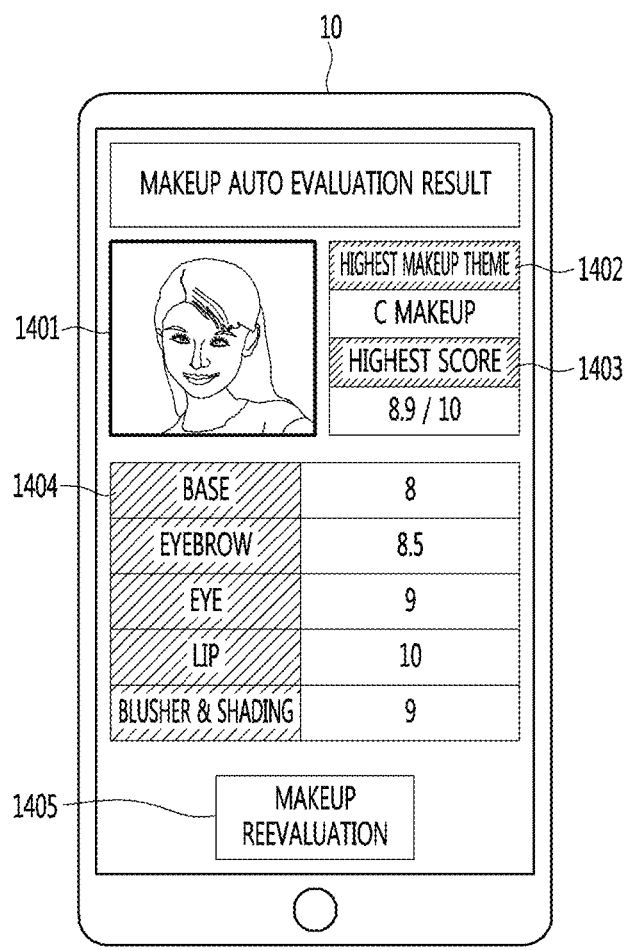

First, FIGS. 14A and 14B are illustrative views for describing a makeup score screen according to an embodiment of the present invention.

A display unit 14 may display a makeup evaluation result screen as shown in FIGS. 14A and 14B. Specifically, the makeup score screen shown in FIG. 14A shows a makeup score evaluated with a makeup theme selected by a user, and the makeup score screen shown in FIG. 14B shows a makeup score according to a makeup theme evaluated with the highest score.

First, each element configuring the makeup evaluation result screen will be described.

The makeup evaluation result screen may include a facial image window 1401, a makeup theme window 1402, a total score window 1403, a score window by region 1404, and a makeup reevaluation icon 1405.

The facial image window 1401 includes a facial image analyzed by a makeup server 100. Thus, a user may reconfirm whether an intended facial image is properly evaluated.

The makeup theme window 1402 shows the makeup theme on which the makeup evaluation is based. The makeup evaluation may be different depending on the makeup theme even for the same facial image. Therefore, it shows whether the user has selected the makeup theme correctly.

The total score window 1403 shows a total score of the makeup evaluation result of the facial image. For example, the total score window 1403 may show an average value of scores for each face region. Thus, the user may confirm his or her makeup result with one index.

The score window by region 1404 shows a result of evaluating makeup by dividing the facial image into regions. Thus, there is an effect that the user may easily know which region's makeup should be complemented.

The makeup reevaluation icon 1405 is an icon for receiving a makeup evaluation by using a new facial image. The control unit 17 may display a makeup evaluation request screen as shown in FIG. 10 as it receives an instruction to select the makeup reevaluation icon 1405.

The mobile terminal 10 displays a makeup evaluation result screen as described above, and may provide an evaluation service similar to an evaluation by a makeup specialist.

According to an embodiment of the present invention, as shown in FIG. 14A, a mobile terminal 10 may display a makeup evaluation result screen evaluated with a selected makeup theme.

Specifically, when a makeup server 100 receives the makeup theme selected by a user, the makeup server 100 may calculate a makeup score of a facial image according to the selected theme. In this case, the mobile terminal 10 may display the makeup theme selected by the user in a makeup theme window 1402, and may display a score according to the makeup theme selected in a total score window 1403 and a score window by region 1404.

According to another embodiment of the present invention, as shown in FIG. 14B, a mobile terminal 10 may display a makeup evaluation result screen with a makeup theme evaluated with the highest score.

Specifically, a makeup server 100 may calculate a makeup score of at least one facial image for each makeup theme. The makeup server 100 may acquire a makeup theme that shows the highest score among the scores calculated for each makeup theme. The makeup server 100 may transmit all the makeup scores for each makeup theme to the mobile terminal 10, or may transmit only the highest score and the makeup theme corresponding to the highest score to the mobile terminal 10.

In this case, the mobile terminal 10 may display the makeup theme evaluated with the highest score in a makeup theme window 1402, and may display the score according to the makeup theme evaluated with the highest score in a total score window 1402 and a score window by region 1404.

According to still another embodiment of the present invention, a mobile terminal 10 may simultaneously display a score according to a makeup theme selected by a user and a score according to a makeup theme evaluated with the highest score.

Figure 15:
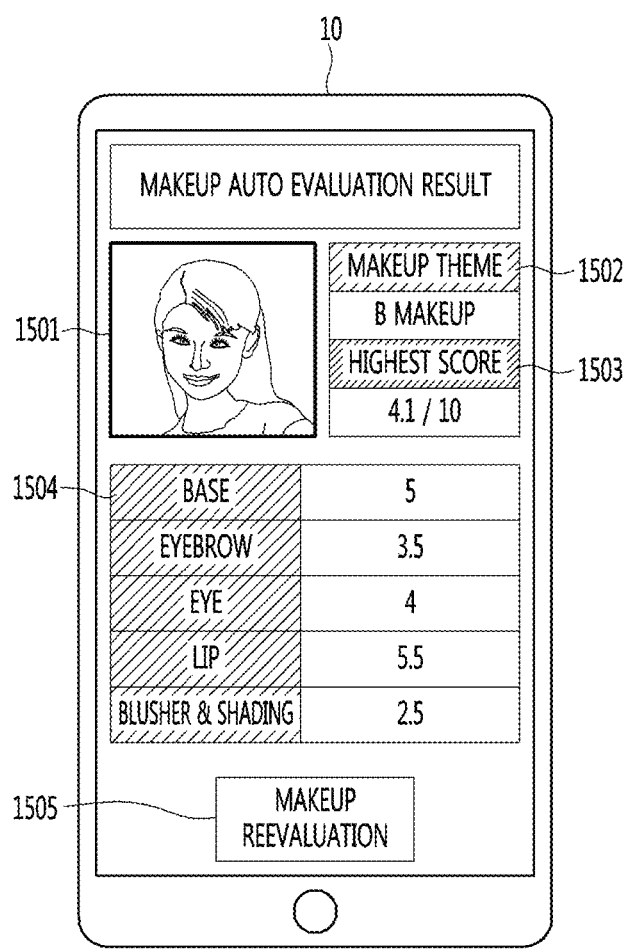
FIG. 15 is a view for describing an effect of a makeup theme on a makeup evaluation according to the first embodiment of the present invention.

Next, FIG. 15 is a view for describing an effect of a makeup theme on a makeup evaluation according to the first embodiment of the present invention.

As described in FIGS. 14A and 14B, a display unit 14 of a mobile terminal 10 may display a makeup evaluation result screen.

The makeup evaluation result screen of FIG. 15 is a makeup evaluation result screen when the same facial image is targeted as compared with FIGS. 14A and 14B, but the makeup theme is different. That is, a facial image window 1501 includes the same facial image as compared with FIGS. 14A and 14B, but a makeup theme 1502 is different from each other.

Accordingly, it may be seen that the makeup evaluation result is different. That is, it may be seen that a total score window 1503 and a score window by region 1404 show different scores as compared with FIGS. 14A and 14B.

Thus, an effect that a user may learn not only a makeup skill but also makeup suitable for the makeup theme is expected.

Figure 16:
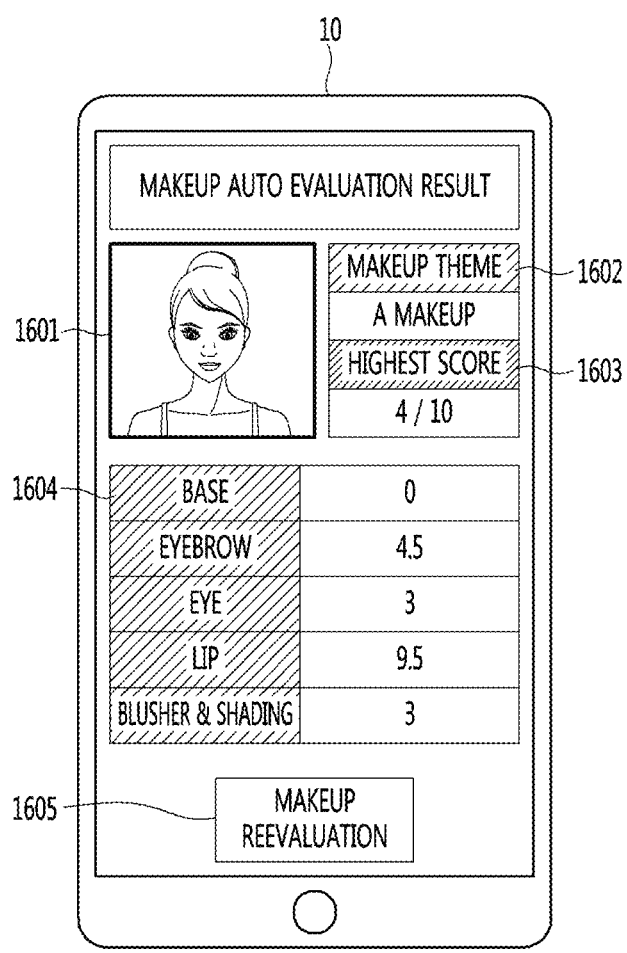
FIG. 16 is a view for describing a score window by region according to the first embodiment of the present invention.

Next, FIG. 16 is a view for describing a score window by region according to the first embodiment of the present invention.

A score window by region 1604 shows a score for each region based on a makeup theme. Accordingly, the score window by region 1604 may show a different score depending on a makeup region. In particular, in association with any one face region, there may be regions that are treated as zero point when it is determined that makeup is completely different from the makeup theme.

Thus, there is an effect that it is possible to guide a user to makeup by a face region.

Figure 17:
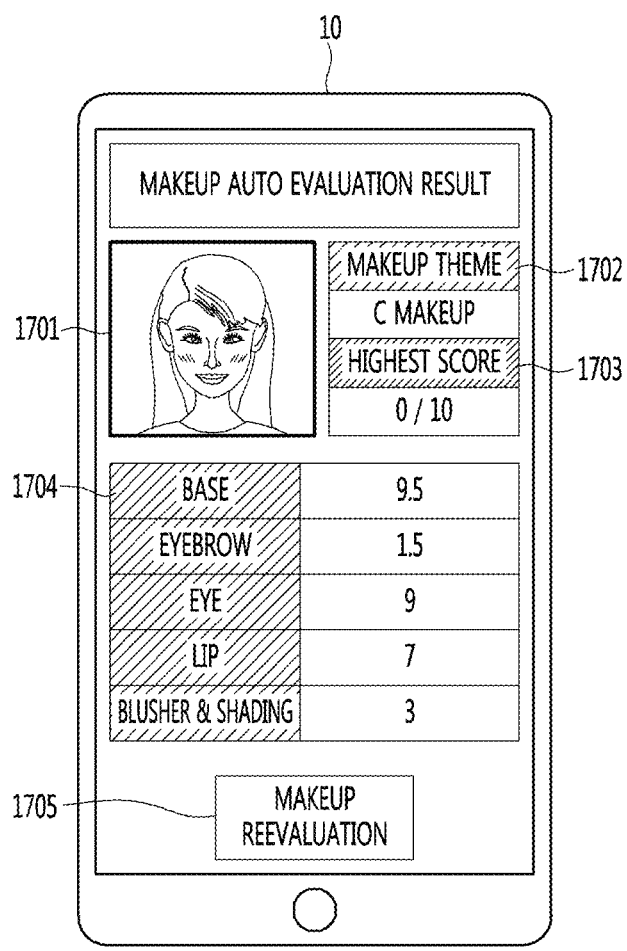
FIG. 17 is a view for describing a makeup balance evaluation according to the first embodiment of the present invention.

Next, FIG. 17 is a view for describing a makeup balance evaluation according to the first embodiment of the present invention.

Referring to FIG. 17, it may be confirmed that a total score 1703 shows zero point, but each region of a score window by region 1704 is not zero point. This may show that a makeup balance of entire face does not match. That is, a makeup evaluation system may evaluate not only makeup by face region but also the makeup balance of the entire face.

Figure 18:
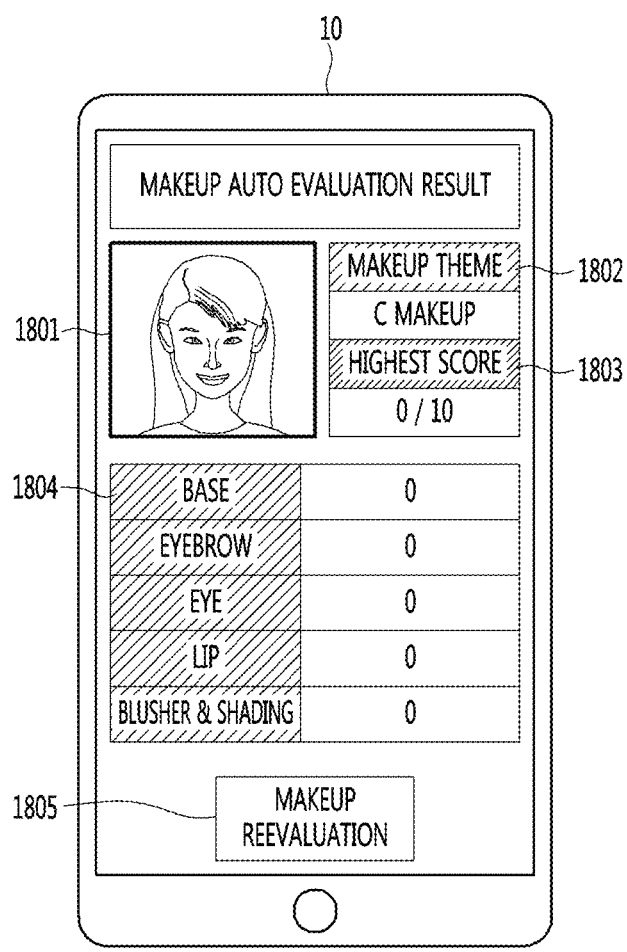
FIG. 18 is a view for describing a no makeup evaluation result according to the first embodiment of the present invention.

Next, FIG. 18 is a view for describing a no makeup evaluation result according to the first embodiment of the present invention.

Referring to FIG. 18, both a total score window 1803 and a score window by region 1804 show the lowest point. This is a case in which a face of a facial image window 1801 is determined as no makeup. As described above, reliability of a makeup evaluation system may be improved by calculating the lowest point corresponding to the face of the no makeup.

Figure 19:
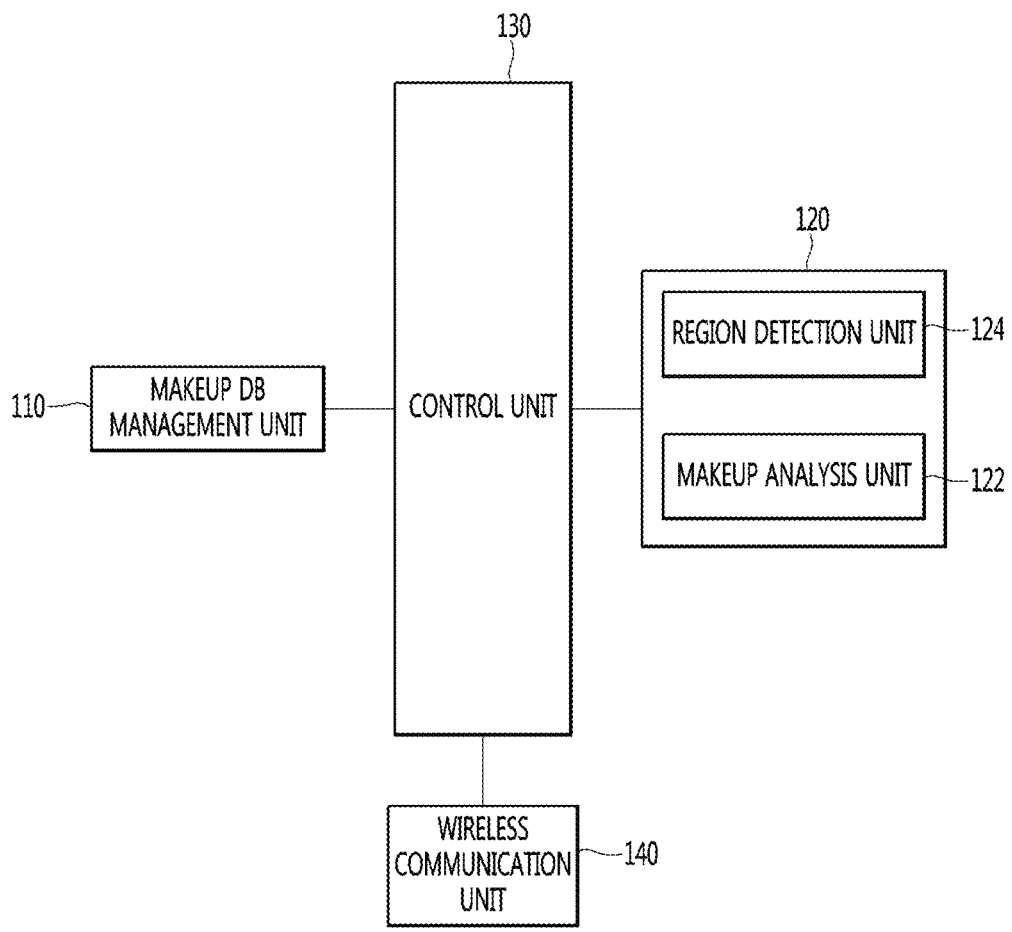
FIG. 19 is a block diagram for describing a makeup server according to a second embodiment of the present invention.

Next, FIG. 19 is a block diagram for describing a makeup server according to the second embodiment of the present invention.

The makeup server 100 may include a makeup DB management unit 110, a makeup evaluation unit 120, a control unit 130, and a wireless communication unit 140.

First, the makeup DB management unit 110 will be described.

The makeup DB management unit 110 may store various data related to a makeup evaluation.

The makeup DB management unit 110 may store at least one evaluation algorithm applied to a face region for evaluating makeup. Here, the face region may be a face region included in an image, which may refer to a face region detected by a region detection unit 124 described later. In addition, the face region may include a region including an entire face and each face part region configuring a face. For example, the face region may include at least one of an entire face region, an eyebrow region, an eye region, a nose region, a cheek region, a forehead region, a chin region, a lip region, and the like.

The evaluation algorithm may be an algorithm that uses an RGB value of at least one pixel configuring the face region included in the image. That is, the image may be an image represented by the RGB value, and the evaluation algorithm may be an algorithm that uses the RGB value of the pixel configuring the face region.

In addition, the evaluation algorithm may be an algorithm that converts the RGB value of at least one pixel configuring the face region included in the image into a Lab color value, and uses the converted Lab color value. That is, the evaluation algorithm may be an algorithm that converts an image represented by the RGB value into a Lab color space and evaluates makeup via the Lab color value. Since the Lab color value does not change depending on an output medium, it is possible to perform consistent evaluation regardless of the output medium when the evaluation algorithm using the Lab color value is applied, and it is advantageous that reliability of the makeup evaluation may be secured.

In addition, the makeup DB management unit 110 may store a score table (see FIG. 34) used for the makeup evaluation. Specifically, the score table may include a plurality of first sample colors and a plurality of second sample colors. Here, the first sample color may be a sample color representing skin color, and the second sample color may be a sample color representing lip color, blusher color, or eye shadow color.

Each of the plurality of first sample colors and the plurality of second sample colors may be mapped, and score data may be mapped to a pair of the first sample color and the second sample color. That is, the score table may be composed of the score data mapped to any one of a plurality of first sample colors and a plurality of second sample colors.

As described above, the score table may be used when evaluating a hue harmony of the makeup. For example, a makeup analysis unit 122 may detect a first color and a second color in the face region of a user, and may evaluate the hue harmony of the makeup based on the first color and the second color. Specifically, the makeup analysis unit 122 searches for the same color as the first color from the plurality of first sample colors, searches for the same color as the second color from the plurality of second sample colors, and acquires a score mapped to a searched pair of colors, thereby evaluating the hue harmony.

In addition, according to one embodiment, the score table may be a table generated based on an input for a makeup evaluation of a makeup specialist. That is, the score table may be a table in which makeup specialists have previously input scores for color combinations.

When the makeup analysis unit 122 described later evaluates the makeup by using the table generated based on the input for the makeup evaluation of the makeup specialist, there is an advantage that it is possible to provide the user with a makeup evaluation result based on expertise. Accordingly, reliability of a makeup evaluation system may be increased.

Next, the makeup evaluation unit 120 will be described in detail.

The makeup evaluation unit 120 may be composed of the region detection unit 124 and the makeup analysis unit 122.

The region detection unit 124 may acquire a facial image included in photographs or a moving images. Specifically, the region detection unit 124 may receive the photographs or the moving images via the wireless communication unit 140, and may detect the facial image to be targeted to makeup evaluation from the photographs or the moving images.

In addition, the region detection unit 124 may detect each region of the face from the facial image. For example, the region detection unit 124 may detect at least one of the eyebrow region, the eye region, the nose region, the cheek region, the lip region, and the chin region.

For example, the region detection unit 124 may detect the face and each part of the face via a face recognition algorithm.

In addition, the region detection unit 124 has an advantage that the face and each part of the face may be recognized more accurately through the deep learning technology in face recognition.

The makeup analysis unit 122 analyzes makeup of the face region and each part of the face acquired by the region detection unit 124. For example, the makeup analysis unit 122 may analyze the makeup of the face region and each region of the face based on the score table and the evaluation algorithm stored in the makeup DB management unit 110. A detailed method will be described later.

According to an embodiment, the makeup analysis unit 122 calculates the makeup score of the facial image based on the makeup analysis result. For example, the makeup analysis unit 122 may calculate a makeup total score and a score by the face region, respectively.

The control unit 130 controls an overall operation of the makeup server 100. Specifically, the control unit 130 may control operations of the makeup DB management unit 110, the makeup evaluation unit 120, and the wireless communication unit 140.

The wireless communication unit 140 may transmit and receive data to/from the outside. For example, the wireless communication unit 140 may receive image data from a mobile terminal 10 or an application server 200. The wireless communication unit 140 may transmit the received image data to the makeup DB management unit 110 or the makeup evaluation unit 120.

Meanwhile, embodiments described below may be implemented in a recording medium readable by a computer or similar device by using, for example, software, hardware, or a combination thereof.

Figure 20:
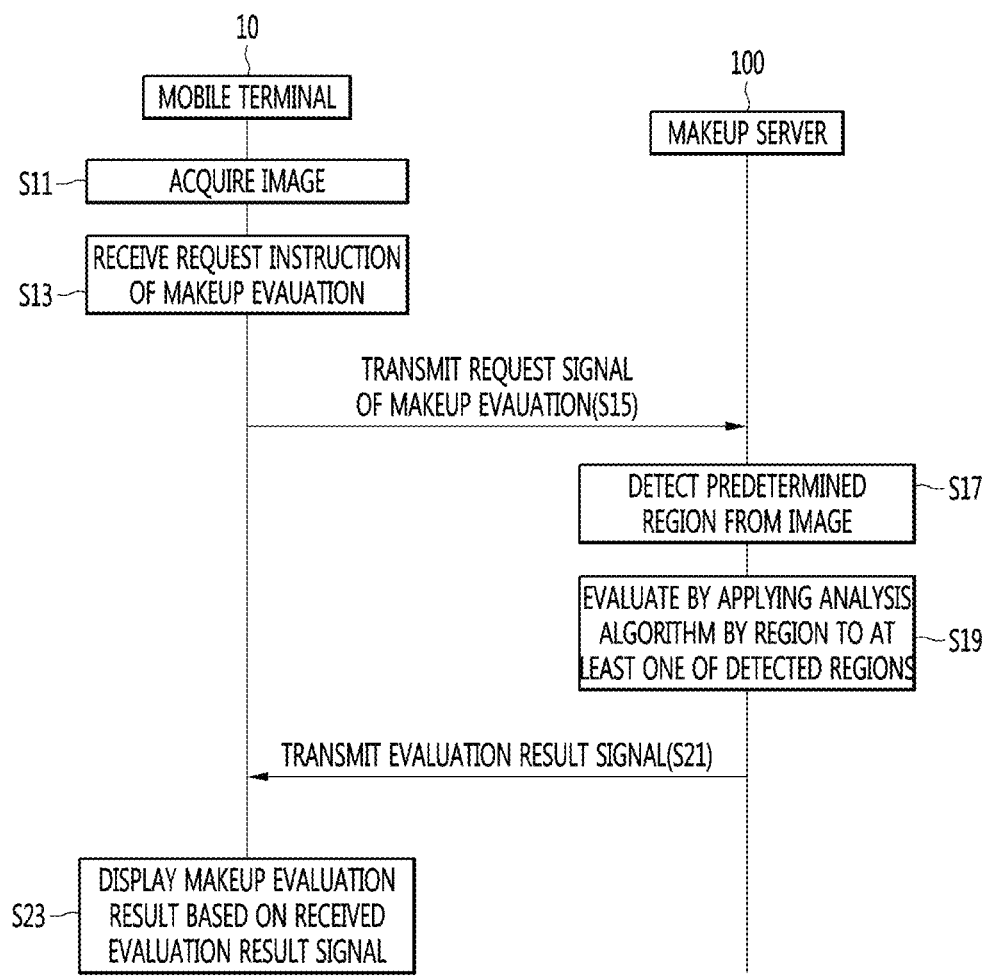
FIG. 20 is a ladder diagram illustrating a method of operating a makeup evaluation system according to the second embodiment of the present invention.

Next, FIG. 20 is a ladder diagram illustrating an operation method of a makeup evaluation system according to the second embodiment of the present invention.

In FIG. 20, for convenience of explanation, the mobile terminal 10 transmits and receives signals to/from the makeup server 100, and it is assumed that the application server 200 described in FIG. 1 is included in the makeup server 100.

The control unit 17 of the mobile terminal 10 may acquire an image (S11).

The control unit 17 may acquire the image via the wireless communication unit 11 or the camera 13. The wireless communication unit 11 may receive the image from the outside. The camera 13 may acquire the image by photographing photographs or moving images A user may transmit or input a makeup facial image to the mobile terminal 10 in order to a makeup evaluation. For example, the user may transmit the image stored outside to the mobile terminal 10, or may photograph a face that is makeup with the camera 13 of the mobile terminal 10.

The control unit 17 of the mobile terminal 10 may receive a request instruction for the makeup evaluation (S11).

The control unit 17 may receive the request instruction for the makeup evaluation via the input unit 12. The input unit 12 may receive the request instruction for the makeup evaluation after receiving an instruction to select at least one image.

The user may input a request for the makeup evaluation in the input unit 12 after selecting the image for which the makeup evaluation is desired.

In addition, the control unit 17 may further receive a makeup theme selection instruction via the input unit 12 when receiving the request instruction for the makeup evaluation. The makeup theme may include natural, lovely, smoky, or the like. The makeup evaluation may be different depending on the makeup theme. Therefore, for a more accurate makeup evaluation, the control unit 17 may receive the instruction to select the makeup theme when receiving the request instruction for the makeup evaluation.

The control unit 17 of the mobile terminal 10 may transmit a makeup evaluation request signal to the makeup server 100 (S15).

The control unit 17 may control so as to transmit the makeup evaluation request signal to the makeup server 100 via the wireless communication unit 11.

The makeup evaluation request signal may include image data. That is, the control unit 17 may transmit the makeup evaluation request signal including image data corresponding to the image acquired in step S11 to the makeup server 100.

The makeup evaluation request signal may be a signal requesting a makeup evaluation corresponding to a face included in an image according to the image data.

The wireless communication unit 140 of the makeup server 100 may receive the makeup evaluation request signal.

The control unit 130 of the makeup server 100 may analyze the image data included in the makeup evaluation request signal. Specifically, the image data included in the makeup evaluation request signal may be data modulated for image transmission. The control unit 130 may restore the image data included in the makeup evaluation request signal into an image.

The control unit 130 of the makeup server 100 may detect a predetermined region from the image received via the makeup evaluation request signal (S17).

The control unit 130 may set in advance at least one evaluation part to be a target of the makeup evaluation. The control unit 130 may detect at least one region corresponding to the evaluation part from the image.

For example, the control unit 130 may set as the evaluation part to be the target of the makeup evaluation at least one of an eyebrow part, a dark circle part, a hue harmony part, a lip part, and a blemish part. However, the evaluation parts listed above are merely an example for the convenience of description, and the present invention is not limited thereto.

The control unit 130 may detect at least one region of an eyebrow region for evaluating the eyebrow part, a dark circle region for evaluating the dark circle part, a hue harmony region for evaluating the hue harmony part, a lip region for evaluating the lip part, and a blemish region for evaluating blemish part from the received image.

At this time, each region such as eyebrow region, dark circle region, and the like is not limited to a corresponding part, and may include at least one part according to an evaluation algorithm by region. For example, the eyebrow region is not limited to an eyebrow part, and may include the eyebrow part and a nose part. Evaluating the eyebrow region is not only for evaluating a shape and color of the eyebrow but evaluating in consideration of harmony of the entire face and the eyebrow part. The detection parts corresponding to each of the regions will be described in detail through the evaluation algorithm by region described later.

The control unit 130 may evaluate by applying the evaluation algorithm for each region to at least one region detected (S19).

The control unit 130 may apply different evaluation algorithms according to the detected region. For example, the control unit 130 may apply a first evaluation algorithm to the eyebrow region and apply a second evaluation algorithm to the dark circle region.

As described above, according to an embodiment of the present invention, instead of applying the same evaluation algorithm to a plurality of detected regions and evaluating them consistently, there is an advantage that the makeup evaluation may be more precisely evaluated by applying different evaluation algorithms according to the detected region.

Next, at least one evaluation algorithm applied to each of the regions detected by the control unit 130 in step S17 will be described.

Figure 26:
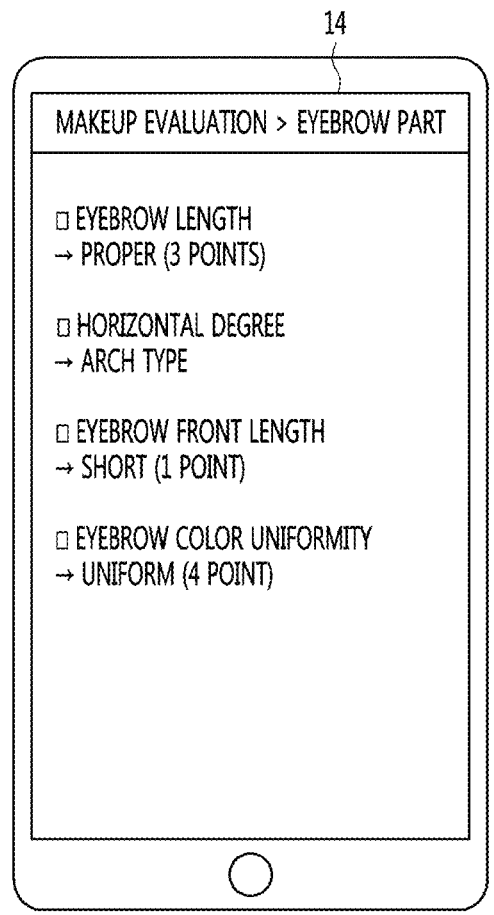
FIG. 26 is an illustrative view for describing a method of displaying an evaluation result of an eyebrow part according to the second embodiment of the present invention.

First, FIGS. 21 to 25 are views for describing an evaluation algorithm applied to an eyebrow part evaluation according to the second embodiment of the present invention. FIG. 26 is an illustrative view for describing a method of displaying an evaluation result of the eyebrow part according to the second embodiment of the present invention.

According to an embodiment of the present invention, the makeup DB management unit 110 of the makeup server 100 may store an evaluation algorithm for evaluating the eyebrow part. The control unit 130 may detect an eyebrow region via a region detection unit 124, and may apply the evaluation algorithm to the eyebrow region detected via a makeup analysis unit 122 in step S17.

The evaluation algorithm for evaluating the eyebrow part may include a plurality of algorithms, and each algorithm may evaluate the eyebrow part differently. For example, the evaluation algorithm for evaluating the eyebrow part may include an algorithm for evaluating an eyebrow length, an algorithm for evaluating a horizontal degree, an algorithm for evaluating an eyebrow front length, and an algorithm for evaluating eyebrow color uniformity.

When applying the evaluation algorithm to the eyebrow region, the makeup analysis unit 122 may analyze and evaluate all the eyebrow length, the horizontal degree, the eyebrow front length, and the eyebrow color uniformity.

A method of evaluating the eyebrow length of the eyebrow region by the control unit 130 will be described with reference to FIG. 21.

The region detection unit 124 may detect a first point 501 which is an outer end of any one eye in an image, and a second point 502 which is an outer end of a nose. At this time, the region detection unit 124 may detect a right end of the nose when an outer end point of a right eye is detected, and a left end of the nose when an outer end point of a left eye is detected.

The makeup analysis unit 122 may acquire a straight line 510 connecting the first point 501 and the second point 502.

The makeup analysis unit 122 may detect a third point 503 which is an outer end of the eyebrow, and may calculate a distance d1 between the third point 503 and the straight line 510.

The makeup analysis unit 122 may determine appropriateness of the eyebrow length through the calculated distance d1. For example, the makeup analysis unit 122 may determine that the eyebrow length is 'short' when the calculated distance d1 is less than a first distance, and may determine that the eyebrow length is 'proper' when the calculated distance d1 is longer than the first distance and less than a second distance, and may determine that the eyebrow length is 'long' when the calculated distance d1 is longer than the second distance. However, such a determination method is merely illustrative, and the present invention is not limited thereto.

A method of evaluating the horizontal degree of the eyebrow region by the control unit 130 will be described with reference to FIG. 22.

The region detection unit 124 may detect a first point 601 which is an inner end of the eyebrow and a second point 602 which is an outer end of the same eyebrow based on any one eyebrow in an image.

The region detection unit 124 may acquire a straight line 610 connecting the first point 601 and the second point 602, and may calculate an angle θ between the straight line and a horizontal line 620.

The makeup analysis unit 122 may determine the appropriateness of the horizontal degree of the eyebrow through the calculated angle θ.

For example, the makeup analysis unit 122 may determine that the horizontal degree of the eyebrow is 'straight' when the calculated angle θ is equal to or less than a first angle, and may determine that the horizontal degree of the eyebrow is 'general type' when the calculated angle θ is greater than the first angle and equal to or less than a second angle, and may determine that the horizontal degree of the eyebrow is 'arch type' when the calculated angle θ is greater than the second angle. However, such a determination method is merely an example, and the present invention is not limited thereto.

In addition, the makeup analysis unit 122 may determine an eyebrow type according to the horizontal degree of the eyebrow such as 'straight line', 'general type' or 'arch type', and may calculate a score of an eyebrow shape according to each type determined. For example, data showing the eyebrow shape according to the eyebrow type may be stored in advance. The makeup analysis unit 122 compares the data of the eyebrow shape according to the determined eyebrow type with the data of the eyebrow shape acquired from the image. As a result of comparison, as a difference between the stored data and the data acquired from the image is smaller, the score may be determined by a manner of calculating the eyebrow score higher.

Figure 23:
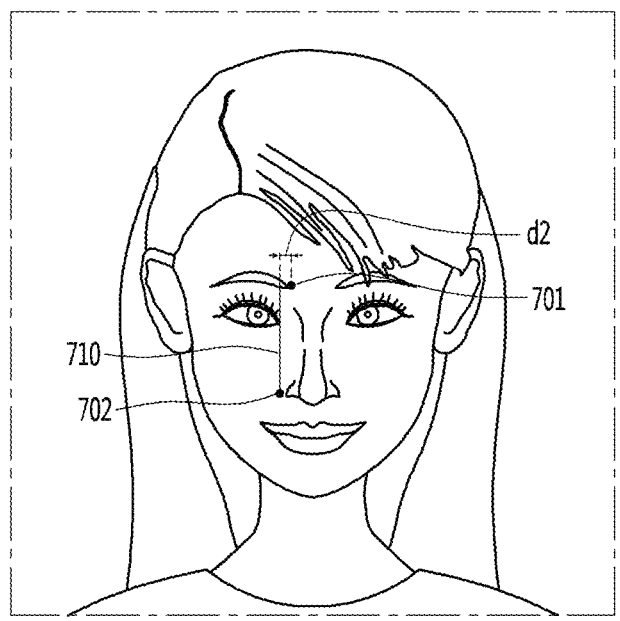

Referring to FIG. 23, a method for the control unit 130 to evaluate the eyebrow front length of the eyebrow region will be described.

The region detection unit 124 may detect a first point 701 which is an inner end of an eyebrow and a second point 702 which is an outer end of a nose based on any one eyebrow in an image. At this time, the region detection unit 124 may detect a right end of the nose when an inner end point of a right eyebrow is detected, and a left end of the nose when an inner end point of a left eyebrow is detected.

The makeup analysis unit 122 may acquire a straight line 710 passing through the second point 702 in the vertical direction and a distance d2 between the straight line 710 and the first point 701.

The makeup analysis unit 122 may determine the appropriateness of the eyebrow front length through the calculated distance d2. For example, the makeup analysis unit 122 may determine that the eyebrow front length is 'short' when the calculated distance d2 is equal to or less than a first distance, and may determine that the eyebrow front length is 'proper' when the calculated distance d2 is longer than the first distance and equal to or less than a second distance, and may determine that the eyebrow front length is 'long' when the calculated distance d2 is longer than the second distance. However, such a determination method is merely an example, and the present invention is not limited thereto.

Figure 21:
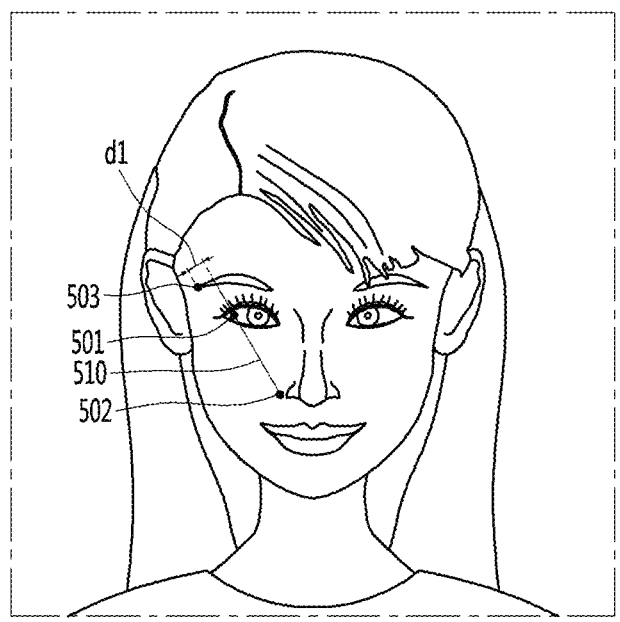
Figure 22:
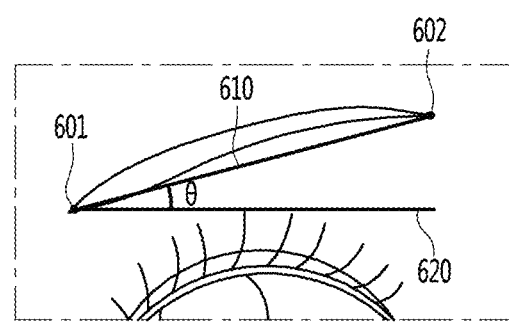

According to the method described in FIGS. 21 to 23, there is an advantage that it is possible to perform a makeup evaluation that reflects a size of the eyes, a size of the nose, and the like, which are different for each person. That is, the eyebrow is not consistently determined that 5 cm is appropriate, but there is an advantage that the makeup may be evaluated in consideration of different facial characteristics such as a length of the person's eyes, a length of the nose, and a position of the eyebrow.

A method for evaluating uniformity of eyebrow color in the eyebrow region by the control unit 130 will be described with reference to FIGS. 24 and 25. The uniformity of the eyebrow color may be an item showing whether the eyebrow color is uniformly made up.

The control unit 130 may perform the eyebrow determination operation in order to determine the uniformity of the eyebrow color.

The region detection unit 124 may detect first to fifth points 801 to 805 in the eyebrow. Specifically, the region detection unit 124 may detect the first point 801 which is an outer end of the eyebrow and the second point 802 which is an inner end of the eyebrow, the third point 803 which is a middle of the first point 801 and the second point 802 of the eyebrows, and the fourth point 804 which is a middle of the first point 801 and the third point 803 of the eyebrow and the fifth point 805 which is a middle of the second point 802 and the third point 803.

As shown in FIG. 24A, the makeup analysis unit 122 may acquire a curve line 810 connecting the first to fifth points 801 to 805.

As shown in FIG. 24B, the makeup analysis unit 122 may acquire a vertical line 820 at each point of the curve line along the curve line 810, and may extract an image value at the vertical line 820. Here, the image value may include RGB values, and the vertical line 820 may be a straight line having a predetermined length.

The makeup analysis unit 122 may acquire a maximum value among the RGB values extracted along the vertical line 820, and determine a point having the maximum value and an image value within a predetermined ratio from the maximum value as the eyebrow. For example, the makeup analysis unit 122 may acquire a maximum value 126 when the extracted image values are 40, 41, 120, 122, 126, 43, 40, and points in which the image values within 20% of the maximum value 126 are 120 and 122 and a point in which the image value is 126 may be determined as the eyebrow.

The makeup analysis unit 122 may perform the eyebrow determination operation described above in a gray channel, a red channel, and a blue channel of the image, respectively.

When FIG. 25A is an original image, the makeup analysis unit 122 may perform the eyebrow determination operation on the gray channel to determine a first region 901 as an eyebrow as shown in FIG. 25B. In addition, the makeup analysis unit 122 may perform the eyebrow determination operation on the red channel to determine a second region 902 as an eyebrow as shown in FIG. 25C.

The makeup analysis unit 122 may measure similarity between the first region 901 and the second region 902. The makeup analysis unit 122 may measure the similarity through an area of an overlapping region of the first region 901 and the second region 902. That is, the makeup analysis unit 122 may calculate the higher the similarity as the area of the overlapping region between the first region 901 and the second region 902 is wider, and the lower the similarity as the area of the overlapping region is narrower.

The makeup analysis unit 122 may determine the eyebrow uniformity through the calculated similarity. For example, the makeup analysis unit 122 may determine that the eyebrow uniformity is 'non-uniform' when the calculated similarity is equal to or less than a first reference value, and may determine that the eyebrow uniformity is 'uniform' when the calculated similarity exceeds a second reference value. However, such a determination method is merely an example, and the present invention is not limited thereto.

Meanwhile, when an area of the second region 902 determined as the eyebrow by the red channel is equal to or less than a reference area, the makeup analysis unit 122 may perform the eyebrow determination operation in a blue channel image to determine a third region 903 as the eyebrow as shown in FIG. 25D. The makeup analysis unit 122 may determine the eyebrow uniformity as described above by measuring the similarity of the first region 901 and the third region 903.

The wireless communication unit 140 may transmit an evaluation result signal to a mobile terminal 10 after evaluating makeup, and a display unit 14 of the mobile terminal 10 may display the evaluation result.

FIG. 26 may be an illustrative view showing a makeup evaluation result of an eyebrow part. The display unit 14 may display evaluation results of an eyebrow length, a horizontal degree, an eyebrow front length, and eyebrow uniformity. However, a method of showing the evaluation result shown in FIG. 26 is merely illustrative.

Figure 27:
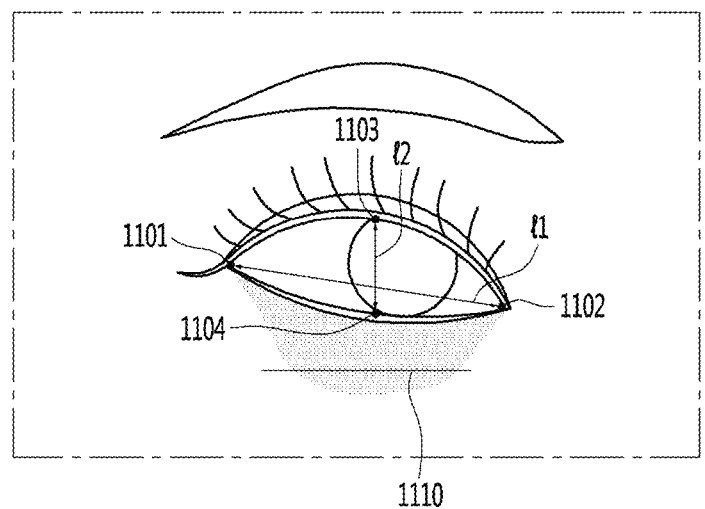
FIGS. 27 and 28 are views for describing an evaluation algorithm applied to a dark circle part evaluation according to the second embodiment of the present invention.
Figure 28:
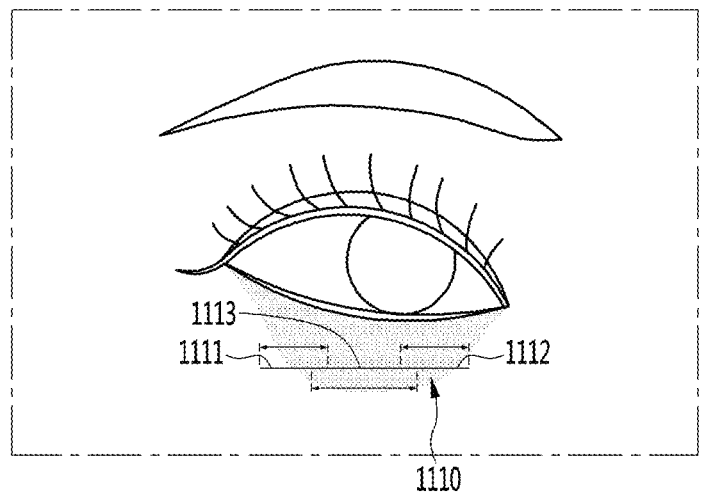
Figure 29:
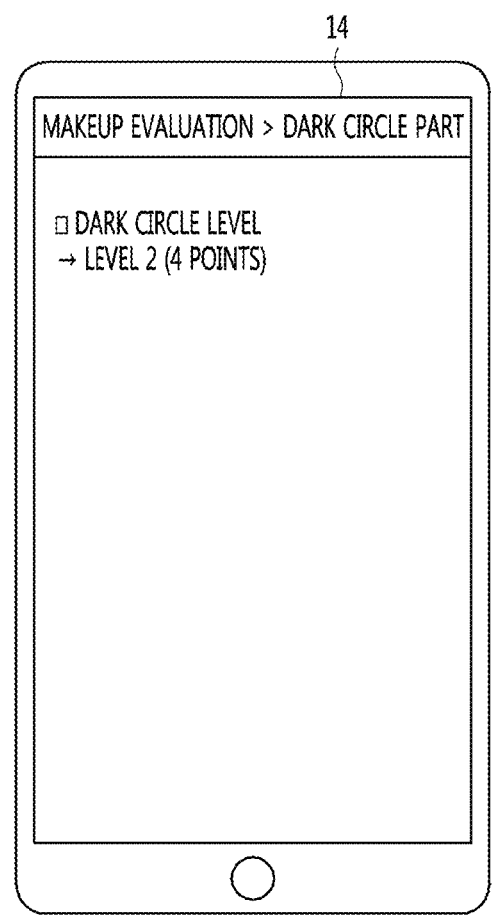
FIG. 29 is an illustrative view for describing a method of displaying an evaluation result of a dark circle part according to the second embodiment of the present invention.

Next, FIGS. 27 and 28 are views for describing an evaluation algorithm applied to a dark circle part evaluation according to the second embodiment of the present invention, and FIG. 29 is an illustrative view for describing a method of displaying an evaluation result of a dark circle part according to an embodiment of the present invention.

The region detection unit 124 may detect a plurality of points in the eye region. For example, the region detection unit 124 may detect first to fourth points 1101 to 1104 in the eye region, and the first point 1101 may be an outer end point of the eye, the second point 1102 may be an inner end point of the eye, the third point 1103 may be an upper end point of the eye, and the fourth point 1104 may be a lower end point of the eye.

The makeup analysis unit 121 may calculate a horizontal distance 11 of the eye by measuring a straight line distance connecting the first and second points 1101 and 1102, and may calculate a vertical distance 12 of the eye by measuring a straight line distance connecting the third and fourth points 1103 and 1104.

The makeup analysis unit 121 may acquire a reference line 1110 based on the first to fourth points 1101 to 1104 and the horizontal distance 11 and the vertical distance 12. For example, the makeup analysis unit 121 may acquire the reference line 1110 having a length corresponding to a predetermined ratio of the horizontal distance 11 at a position spaced apart from the third point 1103 downward by the vertical distance 12. A length of the reference line 1110 may be 80% of the horizontal distance 11, but it is merely illustrative.

Referring to FIG. 28, the makeup analysis unit 121 may extract a maximum value among RGB values of a left ⅓ region 1111 of the reference line 1110, a maximum value among RGB values of a right ⅓ region 1112 of the reference line 1110, and a minimum value among RGB values of a center half region 1113 of the reference line 1110.

The makeup analysis unit 121 may acquire a smaller value among the extracted two maximum values, and may calculate a difference between the acquired smaller value and the above-extracted minimum value. The makeup analysis unit 121 may evaluate a degree of darkness of the dark circles based on the calculated difference.

According to the present invention, it is possible to detect a dark circle target region through the first to fourth points 1101 to 1104 and the eye distance. A surrounding skin color is acquired through the RGB values on both sides in the dark circle target region, and a color of the darkest part under the eyes is acquired through a central RGB value, and thus there is an advantage that it is possible to measure more precisely the darkness of the dark circle. That is, there is an advantage that it is possible to evaluate whether the dark circle is made up so as to be well covered to be similar to the surrounding skin color, rather than simply measuring the dark circle.

Next, FIGS. 30 to 34 are views for describing an evaluation algorithm applied to a hue harmony part evaluation according to the second embodiment of the present invention, and FIG. 35 is an illustrative view for describing a method of displaying an evaluation result of a hue harmony part according to the second embodiment of the present invention.

First, the control unit 130 may control to extract skin color. Specifically, referring to FIG. 30A, the region detection unit 124 may detect a nose region 3001 in a face included in an image. In particular, the region detection unit 124 may detect a nose tip region. The makeup analysis unit 122 may extract a plurality of RGB color values corresponding to a plurality of points included in the nose region 3001, and may calculate an average value of the extracted RGB color values. The makeup analysis unit 122 may extract a color corresponding to the calculated RGB average value as the skin color.

The makeup analysis unit 122 may distribute the extracted skin color in a Lab color space to detect a color closest to the extracted skin color, and may determine the detected color as the skin color. As shown in FIG. 30B, the makeup DB management unit 110 stores a plurality of representative skin colors, and the makeup analysis unit 122 may acquire the color closest to the detected skin color from the stored representative colors, and the acquired color may be determined as the skin color. For example, in FIG. 30, the makeup analysis unit 122 may determine s5 as the skin color.

Next, the control unit 130 may control so as to extract a lip color. Specifically, referring to FIG. 31A, the region detection unit 124 may detect a lip region 3101 in a face included in an image. In particular, the region detection unit 124 may detect a lower lip region. The makeup analysis unit 122 may extract a plurality of RGB color values corresponding to a plurality of points included in the lip region 3101, and may calculate an average of the extracted RGB color values. The makeup analysis unit 122 may extract a color corresponding to the calculated RGB average value as the lip color.

The makeup analysis unit 122 may distribute the extracted lip color in a Lab color space to detect a color closest to the extracted lip color, and may determine the detected color as the lip color. As shown in FIG. 31B, the makeup DB management unit 110 stores a plurality of representative lip colors, and the makeup analysis unit 122 may acquire the color closest to the detected lip color among the plurality of representative lip colors, and the acquired color may be determined as the lip color. For example, in FIG. 31, the makeup analysis unit 122 may determine 17 as the lip color.

Next, the control unit 130 may control so as to extract a blusher color. Specifically, referring to FIG. 32A, the region detection unit 124 may detect a cheek region 3201 from a face included in an image. The cheek region 3201 may include both a left cheek region and a right cheek region.

The makeup analysis unit 122 may perform an obstacle removal operation when extracting the blusher color. Here, the obstacle removal operation may be an operation for minimizing a case in which the cheek region is hidden by hair or the like and the blusher color is determined incorrectly. When the makeup analysis unit 122 performs the obstacle removal operation, the makeup analysis unit 122 may remove a region having a value smaller than a predetermined reference value after converting an image into a gray image, and for example, the predetermined reference value may be 0.35, but it is merely an example and the present invention is not limited thereto. The makeup analysis unit 122 may extract a plurality of RGB color values corresponding to remaining regions except for the removed region in the cheek region 3201, and may calculate an average value of the extracted RGB color values. The makeup analysis unit 122 may extract a color corresponding to the calculated RGB average value as the blusher color.

The makeup analysis unit 122 may distribute the extracted blusher color in a Lab color space to detect a color closest to the extracted blusher color, and may determine the detected color as the blusher color. As shown in FIG. 32B, the makeup DB management unit 110 stores a plurality of representative blusher colors, and the makeup analysis unit 122 may acquire the color closest to the detected blusher color among the plurality of representative blusher colors, and the acquired color may be determined as the blusher color. For example, in FIG. 32, the makeup analysis unit 122 may determine b8 as the blusher color.

Meanwhile, the makeup analysis unit 122 may also determine a value having a large value of 'a' as a representative blusher color in the Lab color space of the cheek region 3201.

Next, the control unit 130 may control so as to extract an eye shadow color.

Specifically, referring to FIG. 33, the region detection unit 124 may detect a region above eyes 3301 from a face included in an image. The region above eyes 3301 may include both a region above the left eye and a region above the right eye.

The makeup analysis unit 122 may perform an obstacle removal operation as described above when extracting the eye shadow color. The makeup analysis unit 122 may extract a plurality of RGB color values corresponding to remaining regions except for the region removed through the obstacle removal operation in the region above eyes 3301, and may calculate an average of the extracted RGB color values. The makeup analysis unit 122 may extract a color corresponding to the calculated RGB average value as the eye shadow color. In particular, the makeup analysis unit 122 may extract a left eye shadow color and a right eye shadow color, respectively. The makeup analysis unit 122 may determine a representative shadow color based on the extracted eye shadow color.

According to one embodiment, the makeup analysis unit 122 may determine a representative shadow color in a different method according to a makeup theme. The makeup analysis unit 122 may determine a value having a large value of 'a' as a representative shadow color in a Lab color space of the extracted left eye shadow color and right eye shadow color when the makeup theme is natural or lovely. The makeup analysis unit 122 may determine a value having a small value of 'L' as the representative shadow color in the Lab color space of the extracted left eye shadow color and right eye shadow color when the makeup theme is smoky. This is because a recommended eye shadow color differs depending on the makeup theme, and the representative shadow color is determined in a different method according to the makeup theme, and thus there is an advantage that it is possible to evaluate whether the makeup is well adapted to the theme as well as whether the makeup is well done.

Next, a method of evaluating a hue harmony with a determined skin color, lip color, blusher color, and shadow color will be described.

The makeup DB management unit 110 may include a plurality of first sample colors and a plurality of second sample colors, and may store a score table in which score data is mapped to a pair of sample colors composed of any one of the plurality of first sample colors and any one of the plurality of second sample colors.

For example, referring to FIG. 34A, the makeup DB management unit 110 may store a skin-lip score table that maps a plurality of skin colors and a plurality of lip colors and shows a score corresponding thereto. The makeup analysis unit 122 may search for the determined skin color and lip color in the skin-lip score table, and may acquire the score mapped to the searched skin color and lip color, and may determine the acquired score as a skin & lip harmony score.

Likewise, referring to FIG. 34B, the makeup DB management unit 110 may store a skin-blusher score table that maps a plurality of skin colors and a plurality of blusher colors and shows a score corresponding thereto. The makeup analysis unit 122 may search for the determined skin color and blusher color in the skin-blusher score table, and may acquire the score mapped to the searched skin color and blusher color, and may determine the acquired score as a skin & blusher harmony score.

Next, a method of determining a skin & eye shadow harmony score will be described. The makeup analysis unit 122 may calculate a difference between the representative shadow color and the skin color determined by the method described with reference to FIG. 33. Specifically, the makeup analysis unit 122 calculates a difference of the 'a' value and a difference of the 'L' value between the representative shadow color and the skin color, respectively, and may determine a score based on the calculated difference of the 'a' value and difference of the 'L' value. Likewise, the makeup analysis unit 122 may determine the score differently according to a makeup theme.

As described above, the makeup analysis unit 122 may determine a hue harmony analysis with the skin in the case of eye shadow differently from the case of the lip color and the blusher. This is because a blusher or a lip tends to be similar in color series even though makeup themes are different, but in the case of eye shadow, the color series may be completely different depending on the makeup theme. Accordingly, there is an advantage that it is possible to evaluate more precisely the hue harmony when determining the hue harmony part of the makeup.

Meanwhile, when extracting at least one of the skin color, the lip color, the blusher color, and the shadow color, the makeup analysis unit 122 may determine it as zero point in the case of the skin color of which a color is not extracted.

The wireless communication unit 140 may transmit the evaluation result signal to the mobile terminal 10 after evaluating the hue harmony part, and the display unit 14 of the mobile terminal 10 may display the evaluation result.

FIG. 30 may be an illustrative view showing the makeup evaluation result for the hue harmony part. The display unit 14 may display the evaluation results of skin & lip harmony, skin & blusher harmony, and skin & eye shadow harmony. However, the method of showing the evaluation result shown in FIG. 30 is merely illustrative.

Figure 37:
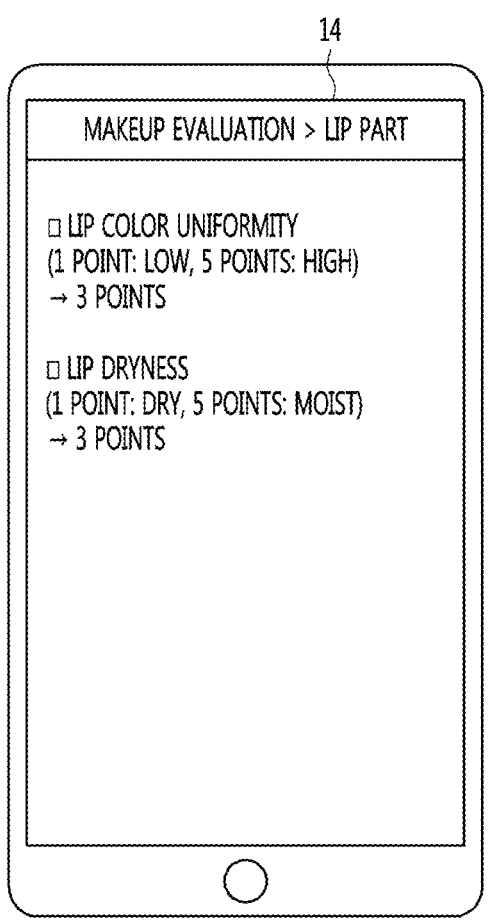
FIG. 37 is an illustrative view for describing a method of displaying an evaluation result of a lip part according to the second embodiment of the present invention.

Next, FIG. 36 is a view for describing an evaluation algorithm applied to a lip part evaluation according to the second embodiment of the present invention, and FIG. 37 is an illustrative view for describing a method of displaying an evaluation result of a lip part according to the second embodiment of the present invention.

A region detection unit 124 may detect a lip region 2001 from a face included in an image. The detected lip region may be as shown in FIG. 36A.

A makeup evaluation unit 120 may evaluate lip uniformity and lip dryness in association with makeup of the lip region 2001. Here, the lip uniformity shows uniformity of the lip color, and may be an item showing whether the makeup of the lip is uniformly well done. The lip dryness may be an item showing whether the makeup of the lip is well done in state of being moist.

First, a method of evaluating the lip uniformity by the makeup evaluation unit 120 will be described. The makeup analysis unit 122 may convert the detected lip region 2001 into a Lab color space, and may acquire an image of a reflection region of the lip region by setting a threshold value in an image in an 'L' space. For example, the makeup analysis unit 122 may detect a region formed by pixels included in a predetermined range of 'L' value in the image in the 'L' space, and may determine the detected region as the reflection region.

FIG. 36B may be an illustrative view showing a reflection region determined by the makeup analysis unit 122. It is illustrated such that a size of a reflection region 2002 is the largest in step 1, and the size of the reflection region 2002 is decreased as it goes to step 5.

The makeup analysis unit 122 may calculate the size of the lip region in the image as shown in FIG. 36A, and may calculate the size of the reflection region detected in the image as shown in FIG. 36B.

The makeup analysis unit 122 may calculate a ratio of the size of the reflection region to the size of the lip region. The makeup analysis unit 122 may evaluate the lip uniformity based on the calculated ratio of the size. That is, the makeup analysis unit 122 may evaluate highly the lip uniformity in the case of the lip shown in step 1, and may evaluate lower the lip uniformity as it goes to step 5.

Similarly, the makeup evaluation unit 120 may evaluate the lip dryness.

The makeup analysis unit 122 may detect the lip region, and may acquire the lip region image 2001 as shown in FIG. 36A.

The makeup analysis unit 122 may acquire a filtered image adopting a high pass filter from the acquired lip region image. The makeup analysis unit 122 may acquire a mask image showing vertical wrinkles of the lip region through threshold setting in an image in R space of the filtered image. That is, the makeup analysis unit 122 may detect a region configured by pixels in which the R value of the lip region is included in a predetermined range, and may determine as a wrinkle region 2002 showing the detected region. The wrinkle region 2002 may be acquired stepwise similar to an example shown in FIG. 36B.

The makeup analysis unit 122 may calculate the size of the lip region in the image as shown in FIG. 36A, and may calculate the size of the wrinkle region 2002 in the image as shown in FIG. 36B.

The makeup analysis unit 122 may calculate a ratio of the size of the wrinkle region to the size of the lip region. The makeup analysis unit 122 may evaluate the lip dryness based on the calculated ratio of the size. That is, the makeup analysis unit 122 may calculate greatly the ratio of the size and evaluate highly the lip dryness in the case of the lip shown in step 1, and may calculate lower the ratio of the size and evaluate lower the lip dryness as it goes to step 5.

Although the reflection region 2002 and the wrinkle region 2002 are described as the same in FIG. 36, it is merely one example for the convenience of description, and the reflection region 2002 and the wrinkle region 2002 may be detected differently in one image, and thus the lip uniformity and the lip dryness may be evaluated differently.

However, the above-described lip part evaluation method is merely an example, and the present invention is not limited thereto.

The wireless communication unit 140 may transmit the evaluation result signal to the mobile terminal 10 after evaluating the lip part, and the display unit 14 of the mobile terminal 10 may display the evaluation result.

FIG. 37 may be an illustrative view showing the makeup evaluation result for the lip part. The display unit 14 may display the evaluation result on the lip uniformity. The display unit 14 may display a score corresponding to lip uniformity and a score corresponding to lip dryness, respectively. However, the method of showing the evaluation result shown in FIG. 37 is merely illustrative.

Figure 39:
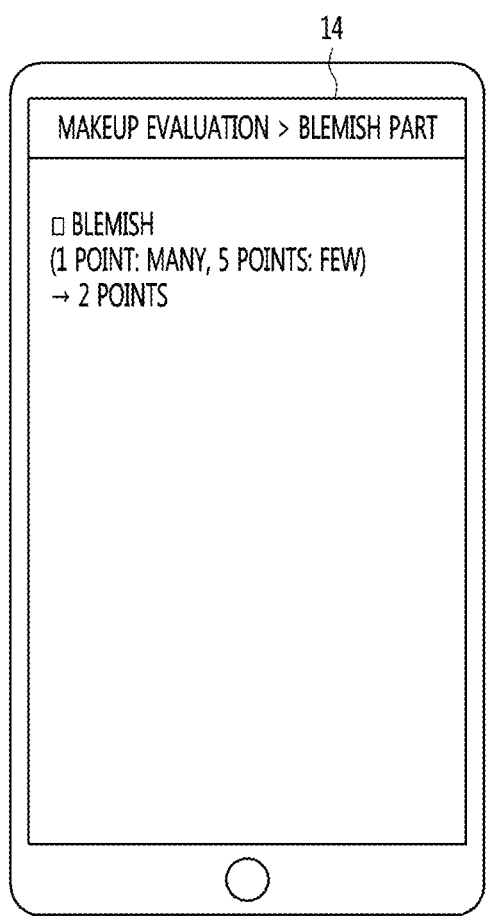
FIG. 39 is an illustrative view for describing a method of displaying an evaluation result of a blemish part according to the second embodiment of the present invention.

Next, FIG. 38 is a view for describing an evaluation algorithm applied to a blemish part evaluation according to the second embodiment of the present invention, and FIG. 39 is an illustrative view for describing a method of displaying an evaluation result of the blemish part according to the second embodiment of the present invention.

An image detection unit 121 may acquire an image, and may detect a face region included in an acquired image. For example, the image detection unit 121 may detect the face region as shown in FIG. 38A.

The image detection unit 121 may detect a cheek region 2201 in the detected face region, and the cheek region 2201 may include a left cheek region and a right cheek region. For example, the image detection unit 121 may detect the cheek region 2201 in the face region as shown in FIG. 38B.

The image detection unit 121 may detect a chin region 2202 in the detected face region. The makeup analysis unit 122 may convert all the pixels included in the chin region 2202 into a Lab space, and may calculate an average value of each of L, a, and b in the converted Lab space to calculate the average Lab value of the skin.

The makeup analysis unit 122 may calculate the RGB average value of the skin by converting the average Lab value into the RGB value.

Next, the makeup analysis unit 122 may set a blemish target region. Specifically, the makeup analysis unit 122 may convert an image including the face region into a Lab color space, and may acquire a gap image corresponding to a difference between the converted Lab and the average Lab value of the skin calculated previously.

The makeup analysis unit 122 may acquire left and right gap images corresponding to differences between the pixels located on a side (left or right) based on each of a plurality of pixels included in the gap image, and may acquire upper and lower gap images corresponding to differences between the pixels located above or below based on each of the plurality of pixels included in the gap image.

The makeup analysis unit 122 may acquire a color difference image corresponding to a sum of squares of the pixel values of the left and right gap images and squares of the pixel values of the upper and lower gap images. The makeup analysis unit 122 may acquire a target region composed of points in which the pixel values in a color difference image are larger than a predetermined threshold value.

The makeup analysis unit 122 may perform a morphological operation on the target region to set a clustering region as a blemish target region 2203 as shown in FIG. 38D.

The makeup analysis unit 122 may acquire heterogeneous points 2213, 2223, and 2233 of which pixel values are different from each other by the predetermined threshold value or more in the blemish target region 2203. In particular, as shown in FIG. 38E, the makeup analysis unit 122 may recognize the heterogeneous points 2213 and 2223 acquired in the cheek region 2201 as a blemish.

The makeup analysis unit 122 may detect a size of the cheek region 2201 and sizes of the heterogeneous points 2213 and 2223 recognized as the blemish, respectively, and may calculate a ratio of the sizes of the heterogeneous points 2213 and 2223 to the size of the cheek region 2201. The makeup analysis unit 122 may evaluate skin uniformity based on the calculated size ratio. For example, the makeup analysis unit 122 may determine as five points when the size ratio is between a first reference value (e.g., 0%) and a second reference value (e.g., 5%), as three points when the size ratio is between the second reference value (e.g., 5%) and a third reference value (e.g., 10%), and as one point when the size ratio is between the third reference value (e.g., 10%) and a fourth reference value (e.g., 20%).

The skin uniformity shows whether the skin color of the face is uniformly made up, and may be an index showing whether the makeup cover is well done such that defects such as blemishes, dots, or wrinkles are not seen.

The wireless communication unit 140 may transmit the evaluation result signal to the mobile terminal 10 after evaluating the blemish part, and the display unit 14 of the mobile terminal 10 may display the evaluation result.

FIG. 39 may be an illustrative view showing the makeup evaluation result for the blemish part. The display unit 14 may display the evaluation result on the blemish. However, the method of showing the evaluation result shown in FIG. 39 is merely illustrative.

FIG. 20 will be described again.

The makeup server 100 may transmit an evaluation result signal obtained by evaluating the makeup to the mobile terminal 10 (S21).

As described above, scores evaluated for each of the detailed evaluation parts such as an eyebrow part, a dark circle part, a hue harmony part, a lip part, and a blemish part, and the like may be summed up to derive a makeup total score. According to an embodiment, a ratio at which each detailed evaluation part contributes to the total score may be set differently according to a makeup theme. For example, when the makeup theme is natural, the total score is calculated to be reflected at a ratio of 60% for a score of the dark circle part and 10% for each score of the remaining the eyebrow part, the hue harmony part, the lip part, and the blemish part. When the makeup theme is smoky, the total score may be calculated to be reflected at a ratio of 35% for the hue harmony part, 40% for the lip part, 15% for the eyebrow part, 5% for the dark circle part, and 5% for the blemish part.

The display unit 14 of the mobile terminal 10 may display the makeup evaluation result based on the received evaluation result signal (S23).

Figure 40:
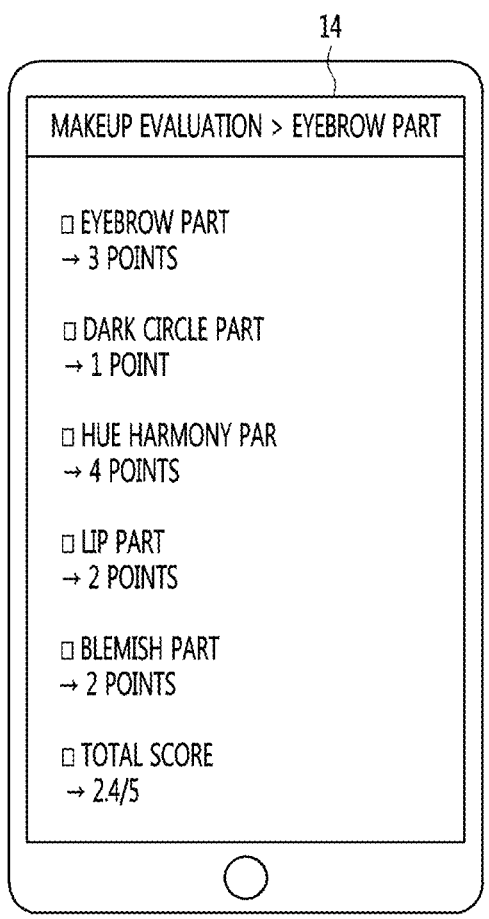
FIG. 40 is an illustrative view for describing a method of displaying a makeup evaluation result according to the second embodiment of the present invention.

The display unit 14 may display the makeup result as shown in FIG. 40.

That is, the display unit 14 may display scores for each of the makeup evaluation parts and the total score.

Alternatively, the display unit 14 may display the makeup evaluation result as shown in FIGS. 26, 29, 35, 37, and 39. In particular, when any one part of a plurality of evaluation parts as shown in FIG. 40 is selected, the display unit 14 may display the evaluation result as shown in FIG. 26, 29, 35, 37, or 39 by the detailed evaluation result of the selected part.

Meanwhile, although it has been described that the makeup server 100 performs a makeup evaluation, it is merely an example for the convenience of description. The mobile terminal 10 may acquire an image to directly perform a makeup evaluation, and in this case, it may receive data related to the makeup evaluation from the makeup server 100.

Meanwhile, the makeup evaluation system has been described above divided into the first embodiment according to FIGS. 3 to 18 and the second embodiment according to FIGS. 19 to 40, but it is merely an example, and the present invention is not limited to this. That is, the makeup evaluation system and the operation method thereof according to the first embodiment described with reference to FIGS. 3 to 18 may be configured in combination with the makeup evaluation system and the operation method thereof according to the second embodiment described with reference to FIGS. 19 to 40.

For example, the makeup analysis unit 122 may output a makeup score by applying the makeup score data as shown in FIG. 6 together with the algorithm described with reference to FIGS. 21 to 25.

In addition, the display unit 14 may combine and display the makeup result screen according to the first embodiment and the makeup result screen according to the second embodiment.

The present invention described above may be implemented as computer-readable codes in a medium on which a program is recorded. The computer-readable medium includes all kinds of recording devices in which computer-readable data is stored. Examples of the computer-readable medium include a hard disk drive (HDD), a solid state disk (SSD), a silicon disk drive (SDD), a ROM, a RAM, a CD-ROM, a magnetic tape, a floppy disk, and an optical data storage, etc. In addition, the computer may include a control unit of a diagnosis device, a control unit of a skin management server, or a control unit of a manufacturing apparatus. Accordingly, the above detailed description should not be construed in a limiting sense in all respects, and should be considered as examples. The scope of the present invention should be determined by rational interpretation of the appended claims, and encompasses all alterations falling within the equivalent scope of the appended claims.

The invention claimed is:

1. A mobile terminal comprising:
   a camera configured to photograph a facial image;
   an input interface configured to receive an instruction to select a makeup theme corresponding to the facial image;
   a wireless communication unit configured to transmit a makeup evaluation request signal corresponding to the facial image to a makeup server;
   a control unit configured to receive a makeup score from the makeup server through the wireless communication unit; and
   a display unit configured to display the makeup score according to the makeup evaluation request signal,
   wherein the makeup score is acquired from makeup score data, is calculated for each of at least one face region detected in the facial image, and is calculated differently according to a shape of the detected face region and the makeup theme, and
   wherein the makeup server, when calculating a first score which is the makeup score of the facial image and acquiring a second score which is a score of a makeup specialist for the facial image, includes a score data generation unit correcting the first score when a difference between the first score and the second score is equal to or greater than a reference value.

2. The mobile terminal of claim 1, wherein the makeup server includes a makeup score learning unit for machine learning a makeup score calculation method through the facial image and the makeup score.

3. The mobile terminal of claim 1, wherein the control unit acquires a highest makeup score among a plurality of makeup scores when the makeup score received from the makeup server is in plural, and the display unit displays the acquired highest makeup score.

4. The mobile terminal of claim 3, wherein the display unit further displays a makeup theme corresponding to the highest makeup score.

5. The mobile terminal of claim 1, wherein the wireless communication unit transmits the makeup evaluation request signal including the makeup theme to the makeup server and receives a makeup score corresponding to the makeup theme from the makeup server.

6. The mobile terminal of claim 1, wherein the display unit displays at least one of the facial image, a makeup total score of the facial image, and a score for each face region of the facial image.

7. The mobile terminal of claim 1, wherein the display unit displays the makeup score as a lowest point when the facial image is a no makeup image.

8. The mobile terminal of claim 1, wherein the display unit, when the score of the face region is not a lowest point, displays a total score as the lowest point according to makeup balance.

9. The mobile terminal of claim 1, wherein the display unit displays the same score in each of the facial images in which makeups are the same and photographing angles are different only.

10. The mobile terminal of claim 1, wherein the makeup score data is data generated based on an input for a makeup evaluation of a makeup specialist.

11. The mobile terminal of claim 10, wherein the makeup score data includes a makeup image by a first group of persons by a makeup theme, a makeup image by a second group of persons, and a makeup image by a third group of persons.

12. The mobile terminal of claim 11, wherein the first group of persons includes general persons, the second group of persons includes beauty-related industry persons, and the third group of persons includes persons who are a makeup specialist.

13. A mobile terminal comprising:
   a camera configured to photograph a facial image;
   an input interface configured to receive an instruction to select a makeup theme corresponding to the facial image;
   a control unit configured to transmit a makeup evaluation request signal corresponding to the facial image; and
   a display unit configured to display a makeup score according to the makeup evaluation request signal,
   wherein the makeup score is acquired from makeup score data, is calculated for each of at least one face region detected in the facial image, and is calculated differently according to a shape of the detected face region and the makeup theme,
   wherein the makeup score data is data generated based on an input for a makeup evaluation of a makeup specialist, and
   wherein the makeup score data includes a makeup image by a first group of persons by a makeup theme, a makeup image by a second group of persons, and a makeup image by a third group of persons.

* * * * *